United States Patent
Shimono et al.

(10) Patent No.: US 9,446,317 B2
(45) Date of Patent: Sep. 20, 2016

(54) SERVER SYSTEM AND METHOD TO PROVIDE BONUS BASED ON LOGIN HISTORY

(71) Applicant: NAMCO BANDAI Games Inc., Shinagawa-ku, Tokyo (JP)

(72) Inventors: Masataka Shimono, Fujisawa (JP); Takashi Hamamura, Osaka (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 594 days.

(21) Appl. No.: 13/713,141

(22) Filed: Dec. 13, 2012

(65) Prior Publication Data

US 2013/0252742 A1    Sep. 26, 2013

(30) Foreign Application Priority Data

Mar. 23, 2012  (JP) .................................. 2012-067066

(51) Int. Cl.

| A63F 9/24 | (2006.01) |
|---|---|
| A63F 13/79 | (2014.01) |
| A63F 13/85 | (2014.01) |
| A63F 13/843 | (2014.01) |
| A63F 13/30 | (2014.01) |
| G06Q 30/02 | (2012.01) |
| A63F 13/69 | (2014.01) |

(52) U.S. Cl.
CPC ................. *A63F 13/79* (2014.09); *A63F 9/24* (2013.01); *A63F 13/12* (2013.01); *A63F 13/30* (2014.09); *A63F 13/69* (2014.09); *A63F 13/843* (2014.09); *A63F 13/85* (2014.09); *G06Q 30/0209* (2013.01); *A63F 2300/204* (2013.01); *A63F 2300/53* (2013.01); *A63F 2300/5546* (2013.01)

(58) Field of Classification Search
CPC ........... A63F 2300/5566; A63F 13/12; A63F 2300/204; A63F 2300/53; A63F 2300/5546; A63F 9/24; G06Q 30/02
See application file for complete search history.

(56) References Cited

U.S. PATENT DOCUMENTS

| 2002/0160838 A1* | 10/2002 | Kim .................................. 463/42 |
| 2006/0264257 A1* | 11/2006 | Jaffe et al. ...................... 463/20 |
| 2010/0227669 A1* | 9/2010 | Van Luchene .......... A63F 13/12 463/23 |
| 2010/0279764 A1* | 11/2010 | Allen et al. ..................... 463/25 |
| 2011/0124415 A1 | 5/2011 | Shimono |
| 2012/0122587 A1* | 5/2012 | Kelly et al. ..................... 463/42 |
| 2012/0150695 A1* | 6/2012 | Fan ........................ G06Q 50/01 705/27.1 |
| 2013/0005473 A1* | 1/2013 | Bethke et al. .................. 463/42 |

FOREIGN PATENT DOCUMENTS

| JP | 2009-119030 A | 6/2009 |
| JP | 2011-110139 A | 6/2011 |
| JP | 2011-206484 A | 10/2011 |

* cited by examiner

*Primary Examiner* — Justin Myhr
(74) *Attorney, Agent, or Firm* — Posz Law Group, PLC

(57) ABSTRACT

A server system refers to the login history of a registered friend player within a given period when an authenticated player has been subjected to a login process. The server system gives a bonus that corresponds to the number (login friend count) of friend users who have logged in within the given period to the authenticated player when the authenticated player has logged in.

11 Claims, 22 Drawing Sheets

FIG. 2
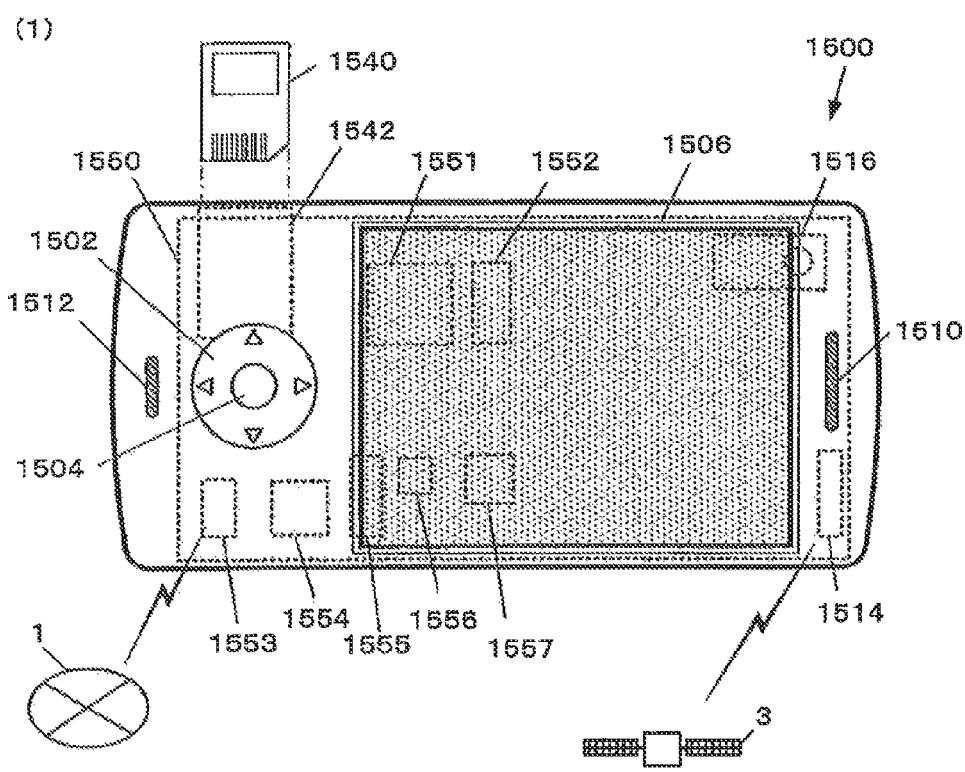
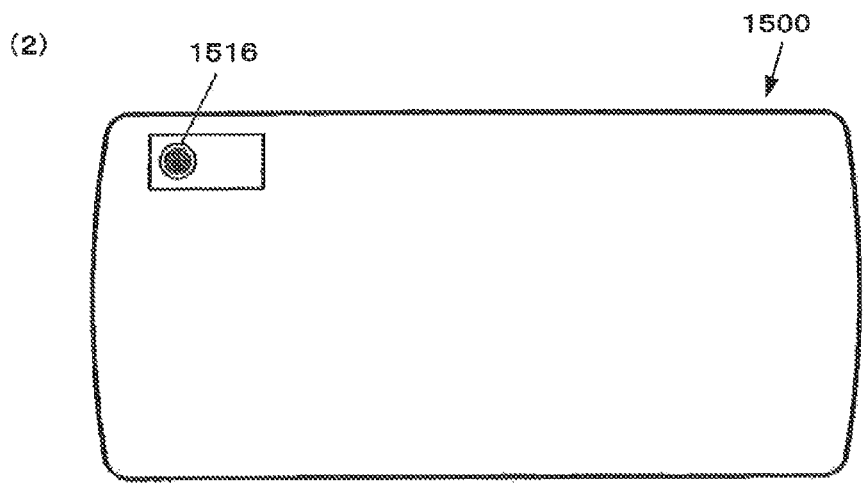

FIG. 4

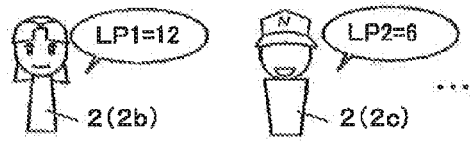

INDIVIDUAL LOGIN POINTS LP = P1+P2+P3+P4+ ··· +Pn

LOGIN HISTORY POINTS P1 = { 1: LOGIN HISTORY WITHIN GIVEN TIME EXISTS
0: NO HISTORY }

LOGIN COUNT POINTS P2 = ADJUSTMENT COEFFICIENT k2 × TOTAL LOGIN COUNT m (UPPER LIMIT OF m IS PROVIDED)

LOGIN DATE/TIME POINTS P3 = { 1: LOGIN HISTORY THAT SATISFIES DATE/TIME CONDITION WITHIN GIVEN TIME EXISTS
0: NO HISTORY
(E.G., DATE/TIME CONDITION: 12:00 TO 13:00, DECEMBER 25) }

LOGIN POSITION POINTS P4 = { 1: LOGIN HISTORY THAT SATISFIES POSITION CONDITION WITHIN GIVEN TIME EXISTS
0: NO HISTORY
(E.G., POSITION CONDITION: WITHIN A RADIUS OF 2 KM AROUND TOKYO STATION) }

LOGIN STATE POINTS P5 = { 1: CURRENTLY IN LOGIN STATE
0: CURRENTLY IN LOGOUT STATE }

TLP=24

TOTAL LOGIN POINTS TLP
= LP1+LP2+ ····
= Σ LPi (i=NUMBER OF FRIEND USERS WHO ARE REFERRED TO WHEN DETERMINING BONUS)

E.G., BONUS (CORRECTION OF ATTACK CAPABILITY PARAMETER)
ATTACK CAPABILITY CORRECTION VALUE Rat=
TLP × PLAYER LEVEL × ADJUSTMENT COEFFICIENT krat

FIG. 10

| APPLIED CONDITION | FRIEND PLAYER SELECTION CONDITION |
|---|---|
| PLAYER LEVEL= LESS THAN 5 | NO (ALL FRIENDS) |
| PLAYER LEVEL= 5 TO 10 OR NUMBER OF FRIENDS=20 TO 40 | SAME SEX, SAME AGE, OR SAME TEAM |
| PLAYER LEVEL= 11 TO 25 OR NUMBER OF FRIENDS=41 TO 60 | SAME SEX AND SAME AGE |
| | PLAYER LEVEL=10 OR MORE |
| PLAYER LEVEL= 26 TO 35 OR NUMBER OF FRIENDS=61 TO 100 | CUMULATIVE PLAY TIME= 50 HOURS OR MORE |
| PLAYER LEVEL= 36 OR MORE OR NUMBER OF FRIENDS= 101 OR MORE | LOGIN POSITION IS CLOSE |
| | POSSESSES SPECIFIC ITEM |
| | CUMULATIVE PLAY TIME= 100 HOURS OR MORE |
| | ⋮ |

550 POINT CALCULATION TARGET FRIEND SELECTION CONDITION DATA
551
552

FIG. 11

| BONUS-GIVING CONDITION | BONUS TYPE |
|---|---|
| TOTAL LOGIN POINTS= 0 TO 10 | CORRECTION OF ATTACK CAPABILITY |
| | CORRECTION OF DEFENSE CAPABILITY |
| | RARE ITEM WIN PROBABILITY: +0.5% |
| TOTAL LOGIN POINTS= 11 TO 50 | CORRECTION OF ATTACK CAPABILITY AND DEFENSE CAPABILITY |
| | MONEY: +20 |
| | RARE ITEM WIN PROBABILITY: +1.2% |
| TOTAL LOGIN POINTS= 51 OR MORE | CORRECTION OF EACH ABILITY |
| | DEFENSE ITEM |
| | ⋮ |

FRIEND LOGIN BONUS TYPE SETTING DATA 560, 561, 562

FIG. 17

FRIEND LOGIN BONUS TYPE SETTING DATA 560C / 561 / 562 / 563

| BONUS-GIVING CONDITION | BONUS TYPE | BONUS-GIVING CONDITION PRESENTATION SETTING |
|---|---|---|
| TOTAL LOGIN POINTS = 0 TO 10 | CORRECTION OF ATTACK CAPABILITY | NO |
| | CORRECTION OF DEFENSE CAPABILITY | NO |
| | RARE ITEM WIN PROBABILITY: +0.5% | NO |
| TOTAL LOGIN POINTS = 11 TO 50 | CORRECTION OF ATTACK CAPABILITY AND DEFENSE CAPABILITY | NO |
| | MONEY: +20 | NO |
| | RARE ITEM WIN PROBABILITY: +1.2% | NO |
| TOTAL LOGIN POINTS = 51 OR MORE | CORRECTION OF EACH ABILITY | NO |
| | DEFENSE ITEM | NO |
| ... | ... | ... |
| LOGIN FRIEND COUNT > 5 | ATTACK CAPABILITY: +2 POINTS | YOU CAN WIN SPECIAL BONUS IF LOGIN FRIEND COUNT INCREASES BY N! (N: APPLIED CONDITION PARAMETER VALUE−CURRENT LOGIN FRIEND COUNT) |
| FRIEND USER WHO HAS LOGGED IN AT POSITION THAT SATISFIES SPECIFIC PLACE CONDITION IS PRESENT | RECOVERY ITEM | YOU CAN WIN SPECIAL BONUS IF YOUR FRIEND LOGS IN AT TOKYO STATION! |
| ... | ... | ... |

SERVER SYSTEM AND METHOD TO PROVIDE BONUS BASED ON LOGIN HISTORY

Japanese Patent Application No. 2012-067066 filed on Mar. 23, 2012, is hereby incorporated by reference in its entirety.

BACKGROUND

An online game is normally designed so that the player registers himself as a user to acquire an account, logs in using the acquired account, and then plays the game. The player can meet another player during the game via a chat in a lobby or the like. A friend function has been known that allows the player to register another player as a friend (or teammate) by performing given registration procedures.

The friend function is considered to be a function that links one player and a plurality of other (different) players (see JP-A-2011-110139 and JP-A-2011-206484, for example).

SUMMARY

According to one aspect of the invention, there is provided a method that causes a computer to manage a login history of each player, and provide a game service, the method comprising:

causing the computer to register a plurality of different players other than one player according to an operation input performed by the one player so that the one player is linked to the plurality of different players; and causing the computer to perform a process that gives a given bonus to the one player when the login history of a different player among the plurality of different players satisfies a given bonus-giving condition.

According to another aspect of the invention, there is provided a server system that manages a login history of each player, the server system comprising:

a registration section that registers a plurality of different players other than one player according to an operation input performed by the one player so that the one player is linked to the plurality of different players; and a bonus-giving section that performs a process that gives a given bonus to the one player when the login history of a different player among the plurality of different players satisfies a given bonus-giving condition.

According to another aspect of the invention, there is provided a non-transitory computer-readable storage medium storing a program that causes a computer to execute a given game according to an operation input performed by a player, the program causing the computer to:

acquire a login history of another player from another computer; and perform a process that gives a given bonus to the player when the login history of the other player satisfies a given bonus-giving condition.

According to another aspect of the invention, there is provided an electronic instrument that can execute a given game according to an operation input performed by a player who operates the electronic instrument, the electronic instrument comprising:

an other player history acquisition section that acquires a login history of another player from another electronic instrument; and a bonus-giving section that performs a process that gives a given bonus to the player when the login history of the other player satisfies a given bonus-giving condition.

BRIEF DESCRIPTION OF THE DRAWINGS

FIG. 2 is a view ((1) front external view and (2) rear external view) illustrating a configuration example of a game device.

FIG. 4 is a view illustrating a bonus determination method based on the number n (n: natural number) of friend players.

FIG. 10 is a view illustrating an example of the data configuration of point calculation target friend selection condition data.

FIG. 11 is a view illustrating an example of the data configuration of friend login bonus type setting data.

FIG. 17 is a view illustrating a modification of the friend login bonus type setting data.

DESCRIPTION OF EXEMPLARY EMBODIMENTS

Figure 1:
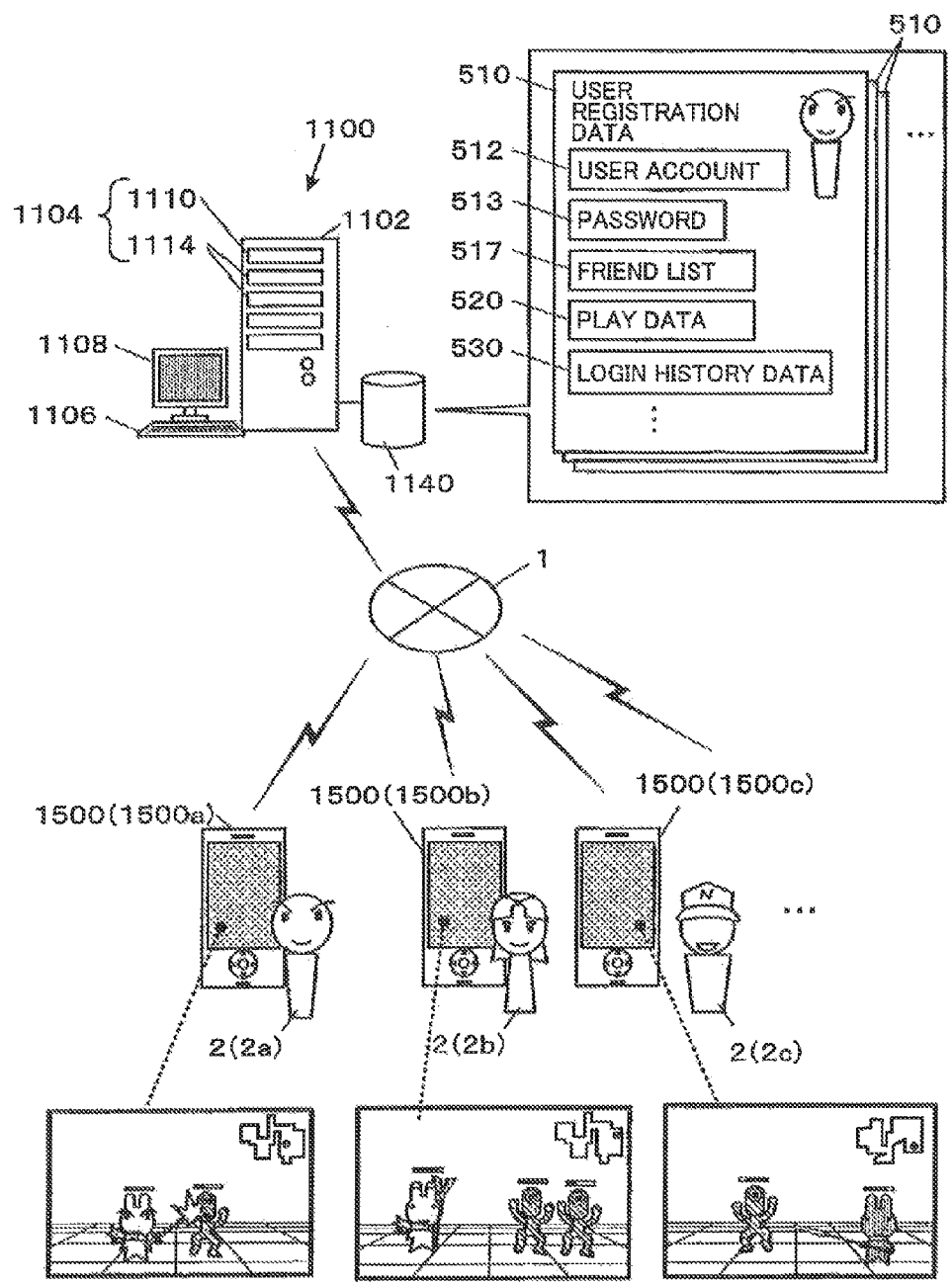
FIG. 1 is a view illustrating an example of the configuration of a game system according to the first embodiment.

Several embodiments of the invention may implement a novel interesting element that utilizes link information about one player and a plurality of other players.

According to one embodiment of the invention, there is provided a method that causes a computer to manage a login history of each player, and provide a game service, the method comprising:

causing the computer to register a plurality of different players other than one player according to an operation input performed by the one player so that the one player is linked to the plurality of different players; and causing the computer to perform a process that gives a given bonus to the one player when the login history of a different player among the plurality of different players satisfies a given bonus-giving condition.

According to another embodiment of the invention, there is provided a server system that manages a login history of each player, the server system comprising:

a registration section that registers a plurality of different players other than one player according to an operation input performed by the one player so that the one player is linked to the plurality of different players; and a bonus-giving section that performs a process that gives a given bonus to the one player when the login history of a different player among the plurality of different players satisfies a given bonus-giving condition.

According to another embodiment of the invention, there is provided a non-transitory computer-readable storage medium storing a program that causes a computer to execute a given game according to an operation input performed by a player, the program causing the computer to:

acquire a login history of another player from another computer; and perform a process that gives a given bonus to the player when the login history of the other player satisfies a given bonus-giving condition.

According to another embodiment of the invention, there is provided an electronic instrument that can execute a given game according to an operation input performed by a player who operates the electronic instrument, the electronic instrument comprising:

an other player history acquisition section that acquires a login history of another player from another electronic instrument; and a bonus-giving section that performs a process that gives a given bonus to the player when the login history of the other player satisfies a given bonus-giving condition.

According to the above configuration, a bonus is given to one player (or the player) based on the login history of another player who is registered in advance. Specifically, it is possible to provide a novel element that gives a bonus to the player corresponding to the login history of the friend player of the player. Since the above configuration allows the player to realize the advantage obtained by increasing the number of friends, it is possible to promote communication between the players, it is also possible to prompt the player to log in. Specifically, since a bonus given to the friend player is affected by a login of the player, it is possible to allow the player to develop friendship, and prompt the player to log in for the friend player.

The method may further comprise:

causing the computer to determine whether or not the login history of the different player satisfies the bonus-giving condition based on the login history of the different player within a given period.

It is possible to further prompt the player to log in by thus determining the bonus based on the login history within the given period (e.g., 24 hours, 1 week, or the period of an event held by the game administrator). When the given period is 24 hours, for example, it is possible to prompt the player to log in at least once a day.

The method may further comprise:

causing the computer to determine whether or not the login history of the different player satisfies the bonus-giving condition based on the login history of the different player within the given period until the one player has logged in; and causing the computer to perform a control process so that the given bonus is valid only during game play performed by the one player based on a current login of the one player.

According to the above configuration, a bonus is given to one player when another player has logged in before the one player has logged in. The bonus given to the player is valid only during game play that has started after the current login. Therefore, the one player can obtain a bonus based on the login history of the other player before the current login irrespective of the login count of the one player within the given period.

In other words, the player can allow a bonus to be given to another player by logging in at an early time within the given period. Therefore, it is possible to prompt the player to log in for another player at an early time within the given period, and also log in at a later time within the given period in order to obtain a bonus based on a login of another player.

The method may further comprise:

causing the computer to change the bonus given to the one player based on a number of different players among the plurality of different players who have logged in within the given period.

According to the above configuration, a bonus that corresponds to the number of different players who have logged in within the given period can be given to the player. Specifically, a bonus given to each player is affected by a login of the friend player. It is thus possible to prompt the player to log in more often taking account of the advantage obtained by the friend player.

The method may further comprise:

causing the computer to change the bonus given to the one player based on a login count of the different player within the given period.

According to the above configuration, a bonus that corresponds to the login count within the given period can be given to the player. This makes it possible to further prompt the player to log in.

The method may further comprise:

causing the computer to change the bonus given to the one player based on a number of different players among the plurality of different players whose login date/time satisfies a given date/time condition.

According to the above configuration, it is possible to prompt the player to log in at a specific date/time or in a specific time zone.

In the method, the login history may include login position information that indicates a place where each player has logged in, and the method may further comprise causing the computer to change the bonus given to the one player based on a number of different players among the plurality of different players whose login position information satisfies a given position condition.

According to the above configuration, a bonus can be given to the player corresponding to the login place of the different player.

The method may further comprise:

causing the computer to select a different player who is subjected to determination as to whether or not the bonus-giving condition is satisfied, from the plurality of different players.

According to the above configuration, it is possible to limit the number of players who are subjected to determination as to whether or not the bonus-giving condition is satisfied. This makes it possible to prevent a situation in which the player uselessly increases the number of registered friend players in order to obtain an advantageous bonus. It is also possible to change the meaning of a login by appropriately setting the other player selection condition, and effectively prompt a relatively experienced player to continuously log in.

The method may further comprise:

causing the computer to present the bonus-giving condition to the one player when the one player has logged in.

It is possible to further prompt the player to log in by thus presenting the information about the bonus-giving condition or hint to the player.

In the method, the given bonus may be changing of a given parameter of play data about the one player.

This makes it possible to change the parameter of the play data as the bonus. It is advantageous to return the parameter value to the original value when a parameter change cancellation condition has been satisfied. The parameter change cancellation condition may be appropriately set, such as detection of a logout, acquisition of a given item, or detection of incapability (e.g., death, shoot-down, or romantic breakup) of the character during the game.

The method may further comprise:

causing the computer to select an item provided to the one player by a lottery from a plurality of items including a rare item, the given bonus may be increasing of a win probability of the rare item during the lottery.

This makes it possible to increase the rare item win probability as the bonus.

Exemplary embodiments of the invention are described below. Note that the following embodiments do not in any way limit the scope of the invention defined by the claims laid out herein. Note also that all of the elements described in connection with the following exemplary embodiments should not necessarily be taken as essential elements of the invention.

First Embodiment

A first embodiment to which the invention is applied is described below taking the case of executing a multi-player online role-playing game (RPG) as an example.
System Configuration FIG. 1 is a view illustrating an example of the configuration of a game system according to the first embodiment. The game system according to the first embodiment includes a game server 1100 that can connect to a communication line 1, and a game device 1500 (1500*a*, 1500*b*, 1500*c*, . . . ) that is provided for each player 2 (2*a*, 2*b*, 2*c*, . . . ) of the game.

The communication line 1 is a data communication channel. Specifically, the communication line 1 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The game server 1100 is a server system that includes one or a plurality of servers, a storage device, and the like. The game server 1100 provides various services for managing the multi-player online game, manages play data necessary for executing the game, and distributes a client program and various types of data.

The game server 1100 includes a housing 1102, a keyboard 1106, a touch panel 1108, and a storage 1140. A plurality of blade servers 1104 are provided in the housing 1102.

The blade servers 1104 include (1) an account management server 1110 that implements a user registration process, a player character initial setting process, and a login/logout process, and (2) a game management server 1114 that manages data (e.g., play data) necessary for executing the game, and distributes the data to the game device 1500 that has logged in and participates in the multi-player online game, for example.

The storage 1140 stores user registration data 510 that is provided corresponding to each registered player.

Note that each of the blade servers 1104 may be implemented as an independent device that can perform data communication through the communication line 1, and appropriately exchanges information necessary for the game server 1100. The functions of each blade server 1104 may be implemented by a plurality of blade servers 1104 in cooperation.

The game device 1500 is a computer (electronic device) that is provided for each player. The game device 1500 is implemented by a smartphone, a portable game device, a stationary consumer game device, an arcade game device, a personal computer, a tablet computer, or the like. The game device 1500 can connect to the communication line 1, and access the game server 1100.

FIG. 2 is a view ((1) front external view and (2) rear external view) illustrating a configuration example of the game device 1500. The game device 1500 includes an arrow key 1502, a home key 1504, a touch panel 1506 that functions as an image display device and a touch position input device, a speaker 1510, a microphone 1512, a Global Positioning System (GPS) antenna 1514, a CCD camera module 1516, a control board 1550, and a memory card reader 1542 that reads and writes data from and into a memory card 1540 (i.e., computer-readable information storage medium). The game device 1500 also includes a built-in battery, a power button, a volume control button, and the like (not illustrated in FIG. 2).

The CCD camera module 1516 includes an autofocus mechanism, a CCD image sensor, and an image signal generation chip, and is disposed so that the rear side of the game device 1500 can be captured (photographed). Note that the image sensor device is not limited to a CCD.

The control board 1550 includes a microprocessor (e.g., central processing unit (CPU) 1551, graphics processing unit (GPU), and digital signal processor (DSP)), an application-specific integrated circuit (ASIC), and an IC memory 1552 (e.g., VRAM, RAM, and ROM).

The control board 1550 also includes a wireless communication module 1553 for connecting to a mobile phone base station, a wireless LAN base station, or the like via wireless communication, an electronic compass 1555, a triaxial gyroscope 1556, and a triaxial acceleration sensor 1557.

The control board 1550 further includes interface (I/F) circuits such as a driver circuit that drives the touch panel 1506, a circuit that receives signals from the arrow key 1502 and the home key 1504, an output amplifier circuit that outputs a sound signal to the speaker 1510, an input signal generation circuit that generates a signal of voice collected by the microphone 1512, and a signal input-output circuit that inputs and outputs a signal to and from the memory card reader 1542. The elements included in (mounted on) the control board 1550 are electrically connected via a bus circuit or the like so that the elements can exchange data and signals.

The GPS module 1554 and the GPS antenna 1514 function as a means that acquires position information by utilizing the GPS. The GPS module 1554 outputs the position information (e.g., latitude and longitude) and additional information (absolute time) every given time (e.g., every second) as data that can be processed by the control board 1550 based on a signal that is output from a GPS satellite 3 and received via the GPS antenna 1514. Note that the positioning system is not limited to the GPS. A satellite positioning system other than the GPS, or a positioning system that does not utilize a satellite may also be used as the positioning system. When using a positioning system that does not utilize a satellite, the wireless communication module 1553 may acquire the position information by performing a positioning process using the principle of triangulation based on a signal from a mobile base phone station to which the wireless communication module 1553 can connect via wireless communication, for example.

The control board 1550 temporarily stores a game client program and data acquired from the game server 1100 in the IC memory 1552. The control board 1550 executes the program to perform a calculation process, and controls each section of the game device 1500 based on an operation input performed using the arrow key 1502, the home key 1504, and the touch panel 1506 to implement the online RPG. Note that the game device 1500 may read the necessary program and the setting data from the memory card 1540 instead of acquiring the necessary program and the setting data from the game server 1100.

Outline of Game

The player must acquire a user account by performing given procedures when playing the multi-player online game according to the first embodiment. The player can play the game when the player has completed a login process using a password that is linked to the acquired user account. Note that the user account is specific to each player, and the same user account as the user account that has been registered cannot be used.

The multi-player online game according to the first embodiment supports a known chat function that allows the player to chat with another user (player) the player met in a game field, a lobby, or the like during the game (i.e., the players can have a conversation). The game server 1100 provides a function that allows each player to register or unregister another player who has turned out to be congenial with the player through a conversation as a "friend" by performing given registration procedures.

A player who is registered as a friend is hereinafter referred to as "friend player". Information about the user account of the friend player is stored in the storage 1140 as a friend list 517 that is included in (or linked to) the user registration data 510 (see FIG. 1).

The game server 1100 according to the first embodiment manages the login history of each player as login history data 530. The login history data 530 includes at least the login date/time. The login history data 530 is stored in the storage 1140 so that the login history data 530 is included in (or linked to) the user registration data 510 (see FIG. 1).

In the first embodiment, a bonus is given to a player (hereinafter referred to as "authenticated player") when the player has logged in based on login history information about his friend player who has logged in on the same day. The bonus is hereinafter referred to as "friend login bonus".

Friend Login Bonus

Figure 3:
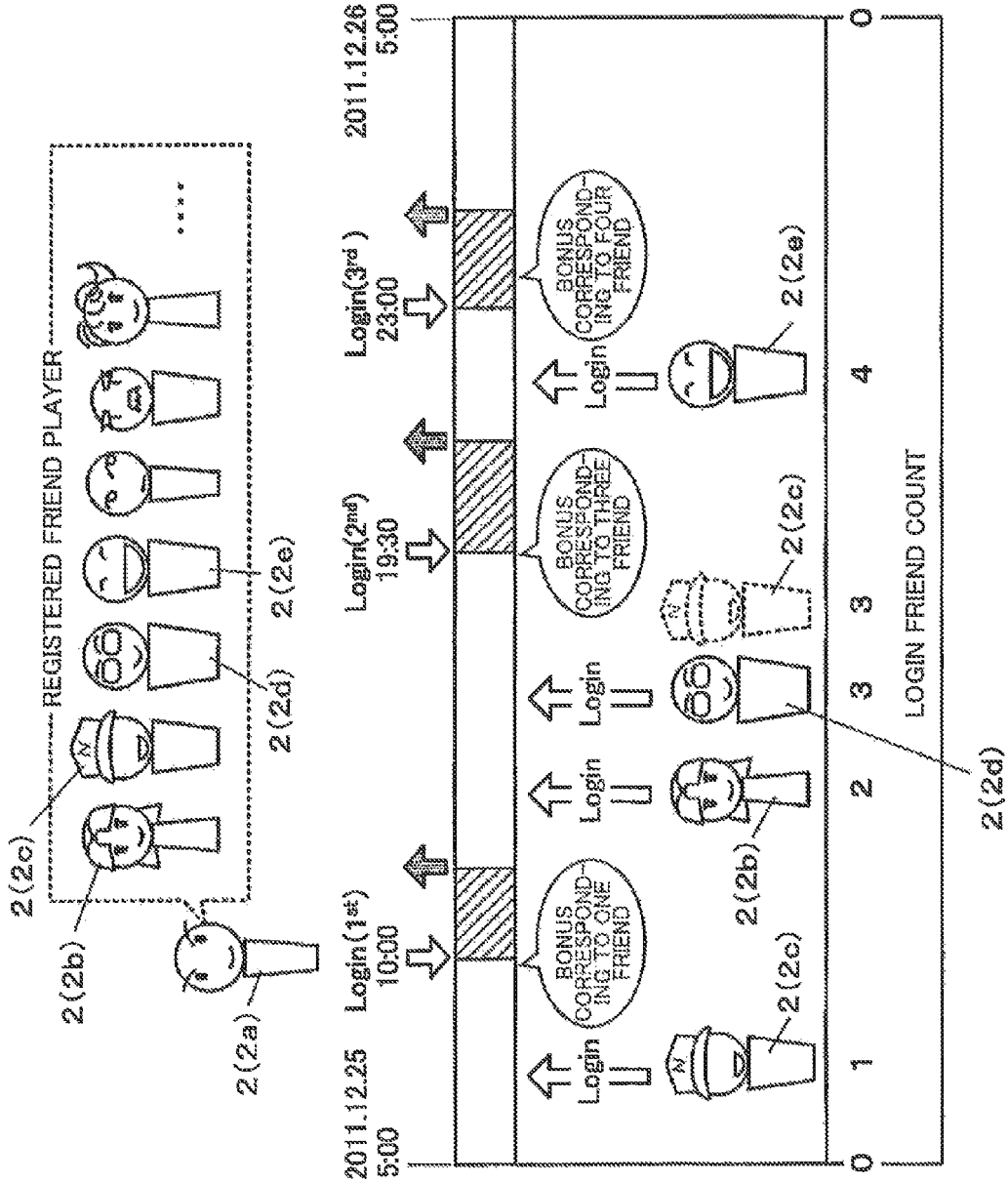
FIG. 3 is a schematic view illustrating a friend login bonus.

FIG. 3 is a schematic view illustrating the friend login bonus according to the first embodiment. The bonus is given on a basis of a given period (from 5:00 on the day to 5:00 on the next day (24 hours) in the example illustrated in FIG. 3). Note that the start time and the length of the given period may be appropriately set.

The player 2 (2a) has registered his friend players 2b, 2c, 2d, . . . . When the player 2 (2a) has logged in as the authenticated player, the game server 1100 determines the bonus given to the player 2 (2a) based on the login history within the given period referring to the login history data 530 (see FIG. 1) about each friend player of the player 2 (2a), and gives the bonus to the player 2 (2a).

More specifically, a more advantageous bonus is selected as the number of friend players who have logged in for the first time within the given period until the authenticated player 2a has logged in increases, and the selected bonus is given to the authenticated player 2a. Note that the number of friend players who have logged in for the first time within the given period is hereinafter referred to as "login friend count".

In the example illustrated in FIG. 3, the friend player 2c has logged in by 10:00 at which the authenticated player 2 (2a) has logged in for the first time. Therefore, the login friend count is "1". In this case, the game server 1100 gives a bonus that corresponds to one friend player to the authenticated player 2 (2a).

The friend players 2b, 2c, and 2d have logged in for the first time within the given period by 19:30 at which the authenticated player 2 (2a) has logged in for the second time. Therefore, the login friend count is "3". In this case, the game server 1100 gives a bonus that corresponds to three friend players to the authenticated player 2 (2a). Note that the friend player 2c (see the character indicated by the broken line in FIG. 3) has logged in for the second time within the given period by 19:30 at which the authenticated player 2 (2a) has logged in for the second time. In the first embodiment, the second login by the friend player 2c is not added to the login friend count.

The friend players 2b, 2c, 2d, and 2e have already logged in for the first time by 23:00 at which the authenticated player 2 (2a) has logged in for the third time. Therefore, the login friend count is "4". In this case, the game server 1100 gives a bonus that corresponds to four friend players to the authenticated player 2 (2a).

Note that the login friend count is automatically reset to "0" at 5:00 on the next day (i.e., at a timing at which the given period (24 hours) has elapsed).

FIG. 4 is a view illustrating a bonus determination method based on the number n (n: natural number) of friend players. In the first embodiment, individual login points LP are calculated for each of the n friend players 2b, 2c, . . . , and 2n who have logged in for the first time by the time at which the authenticated player 2 (2a) has logged in, and the bonus is determined corresponding to total login points TLP.

More specifically, the individual login points LP are described as a function of sub-points based on various login parameters of the friend player.

In the example illustrated in FIG. 4, the individual login points LP are calculated by adding up (1) login history points P1 that are given when the friend player has logged in within the given period, (2) login count points P2 that are given based on the total login count within the given period, (3) login date/time points P3 that are given when it has been determined that a login history that satisfies a date/time condition (e.g., 12:00 to 13:00, December 25) that can be arbitrarily set by the game administrator exists, (4) login position points P4 that are given when it has been determined that a login history that satisfies a position condition (e.g., around Tokyo Station) that can be arbitrarily set by the game administrator exists based on the position information that can be acquired from the game device 1500, and (5) login state points P5 that are given when the friend player is in a login state at the calculation timing of the individual login points LP.

The friend login bonus is basically determined so that the authenticated player 2 (2a) has more advantages as the total login points TLP increase. For example, when the friend login bonus is correction of the ability parameter of the player character, it is preferable to calculate the correction value using a function that contains the total login points TLP as a variable. When the friend login bonus is an item, items in a number corresponding to the total login points TLP may be given to the authenticated player 2 (2a), or a rarer item may be given to the authenticated player 2 (2a) as the total login points TLP increase.

Note that the sub-points may be appropriately changed, added, or omitted taking account of the game balance. For example, the login count points P2 may be omitted. Each sub-point-giving condition and the number of points that are given when the giving condition is satisfied may also be appropriately changed. For example, "2" points may be given as the login date/time points P3 "when the first login was performed in a given time zone".

It is also possible to employ a configuration in which the game play of the friend player is reflected in the points. For example, points may be added using a function that contains the amount charged to the friend player, an action parameter (i.e., a parameter that is consumed corresponding to the action of the player character (also referred to as "action points" or the like) of the friend player, the play time (e.g., the cumulative play time within a given period) of the friend player, or the like as a variable. The function may be designed so that higher points are calculated as the value of the variable increases.

A user experience that relates to the friend login bonus is described below.

Figure 5:
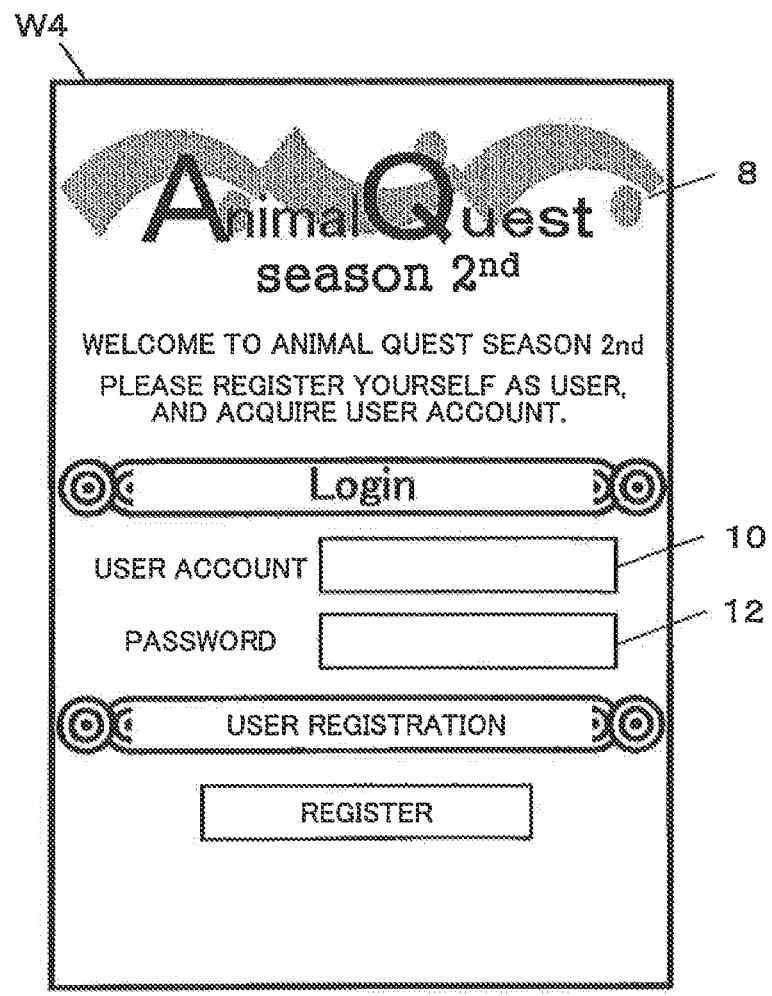
FIG. 5 is a view illustrating an example of a login screen.

FIG. 5 is a view illustrating an example of a login screen. A login screen W4 is displayed when the game device 1500 has accessed the game server 1100. The login screen W4 may have an arbitrary layout. For example, the login screen W4 includes a game title 8, an account field 10 for inputting the user account, and a password field 12 for inputting the password.

When the player has successfully logged in, the game server 1100 gives a bonus to the authenticated player, and provides the game device 1500 with information for displaying various types of bonus information. The game device 1500 displays various types of bonus information based on the information provided by the game server 1100. For example, the game device 1500 displays a notification screen W6 illustrated in FIG. 6.

Figure 6:
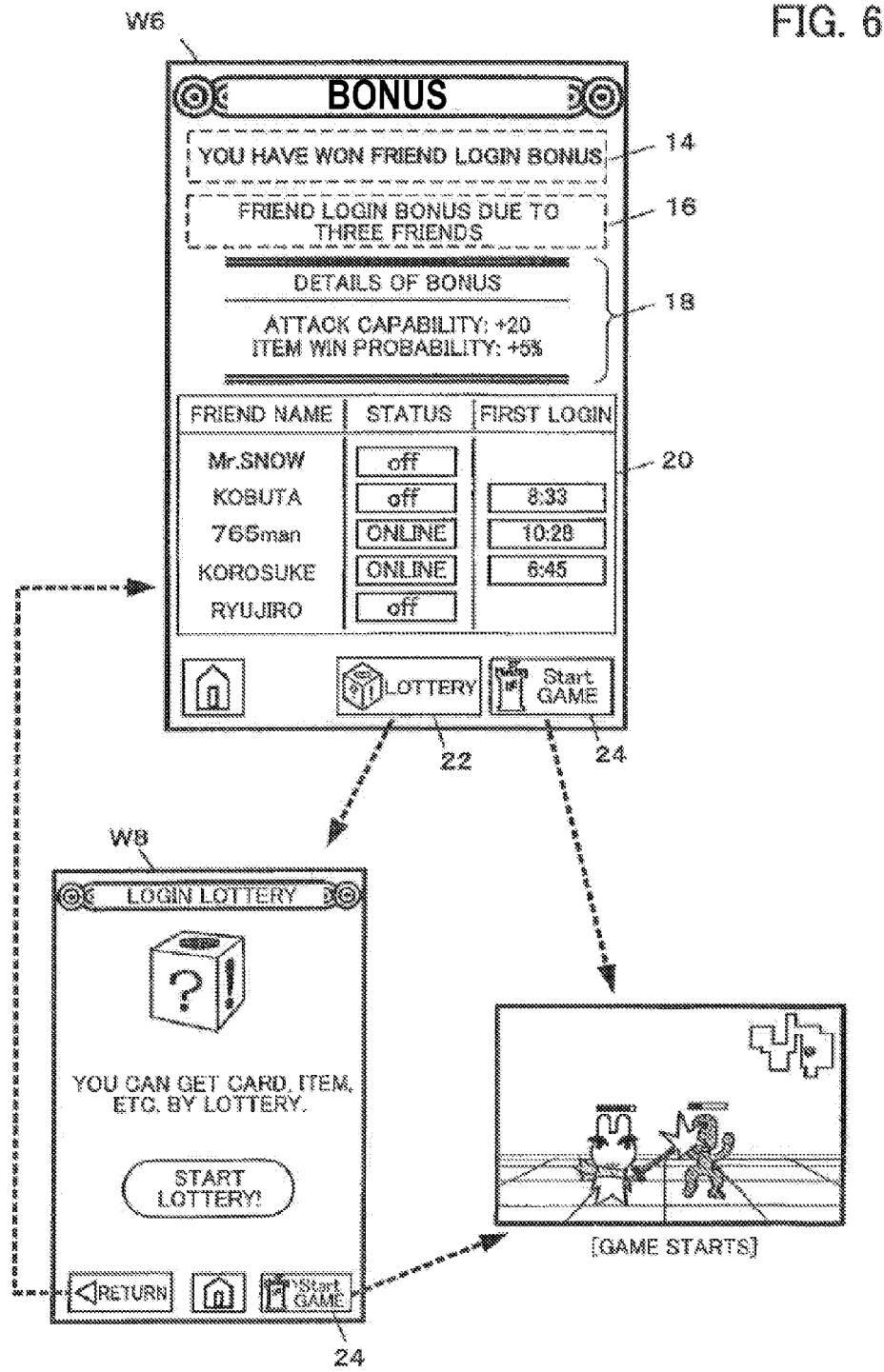
FIG. 6 is a view illustrating an example of a notification screen.

The notification screen W6 includes (1) a friend login bonus notification display 14 that informs the player that the login bonus has been given to the player, (2) a login friend count display 16 that indicates the number of friend players to which the bonus corresponds, (3) a bonus detail display 18 that indicates the details of the friend login bonus given to the player, and (4) a friend status display 20 that indicates the state (the current online/offline state and the first login time in the example illustrated in FIG. 6) of each friend player.

A lottery icon 22 for starting a lottery that can be played once after the player has logged in, and a game start icon 24 for inputting a game start operation are also displayed at arbitrary positions of the notification screen W6. A lottery screen W8 is displayed when the player has touched the lottery icon 22, and the player can play a lottery for obtaining an item that can be used in the game. An item is given to the player based on the lottery result. A rare item may be given to the player by a lottery. The rare item is given based on a given rare item win probability. The bonus based on the login friend count may increase or decrease the rare item win probability only once. The game starts when the player has touched the game start icon 24.

Functional Blocks

A functional configuration that implements the first embodiment is described below.

Figure 7:
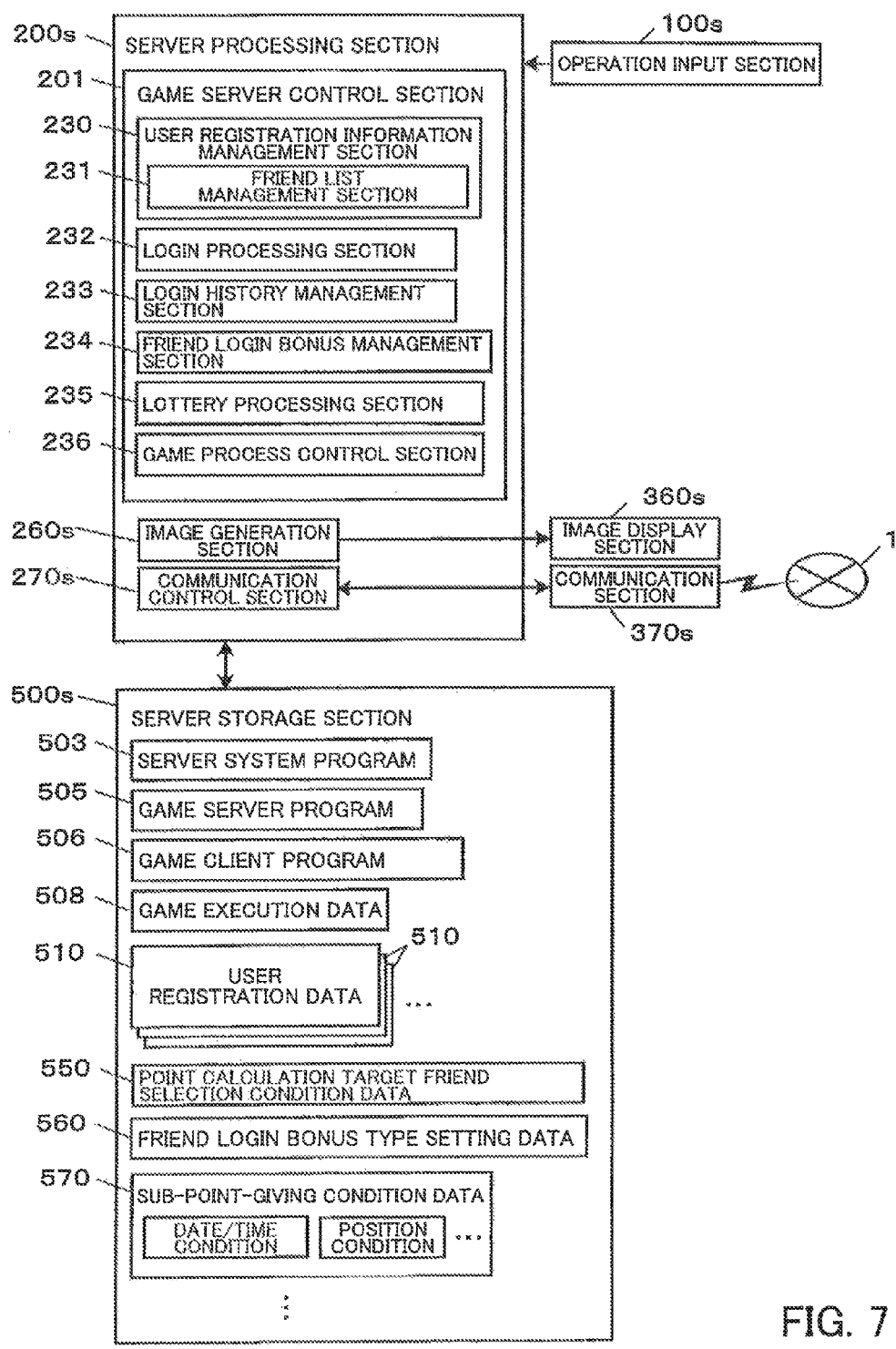
FIG. 7 is a functional block diagram illustrating an example of the functional configuration of a game server according to the first embodiment.

FIG. 7 is a functional block diagram illustrating an example of the functional configuration of the game server 1100 according to the first embodiment. As illustrated in FIG. 7, the game server 1100 includes an operation input section 100s, a server processing section 200s, an image display section 360s, a communication section 370s, and a server storage section 500s.

The operation input section 100s outputs an operation input signal to the server processing section 200s corresponding to an operation input performed by the server operator. The operation input section 100s may be implemented by a keyboard, a touch panel, a mouse, a trackpad, or the like. The keyboard 1106 and the touch panel 1108 illustrated in FIG. 1 correspond to the operation input section 100s.

The server processing section 200s is implemented by electronic parts such as a microprocessor (e.g., CPU and GPU), an ASIC, and an IC memory. The server processing section 200s exchanges data with each functional section, and performs a calculation process based on a given program, data, the operation input signal from the operation input section 100s, a request from an external device (another computer) that has accessed the game server 1100 from the outside via the communication section 370s, and the like to control the operation of the game server 1100. The blade server 1104 (i.e., control board) illustrated in FIG. 1 corresponds to the server processing section 200s. The server processing section 200s according to the first embodiment includes a game server control section 201, an image generation section 260s, and a communication control section 270s.

The game server control section 201 implements a function of preparing/executing the online game according to the first embodiment. The game server control section 201 includes a user registration information management section 230, a login processing section 232, a login history management section 233, a friend login bonus management section 234, a lottery processing section 235, and a game process control section 236.

The account management server 1110 illustrated in FIG. 1 corresponds to the user registration information management section 230, the login processing section 232, and the login history management section 233. The game management server 1114 illustrated in FIG. 1 corresponds to the friend login bonus management section 234, the lottery processing section 235, and the game process control section 236.

The user registration information management section 230 performs a user information acquisition/registration management process (e.g., a process that issues a new user account or registers a password). The user registration information management section 230 includes a friend list management section 231 that edits the friend list corresponding to an operation input performed by the player, and stores the friend list in the server storage section 500s. Note that the user registration information management section 230 may be implemented by appropriately utilizing known user registration technology.

Figure 8:
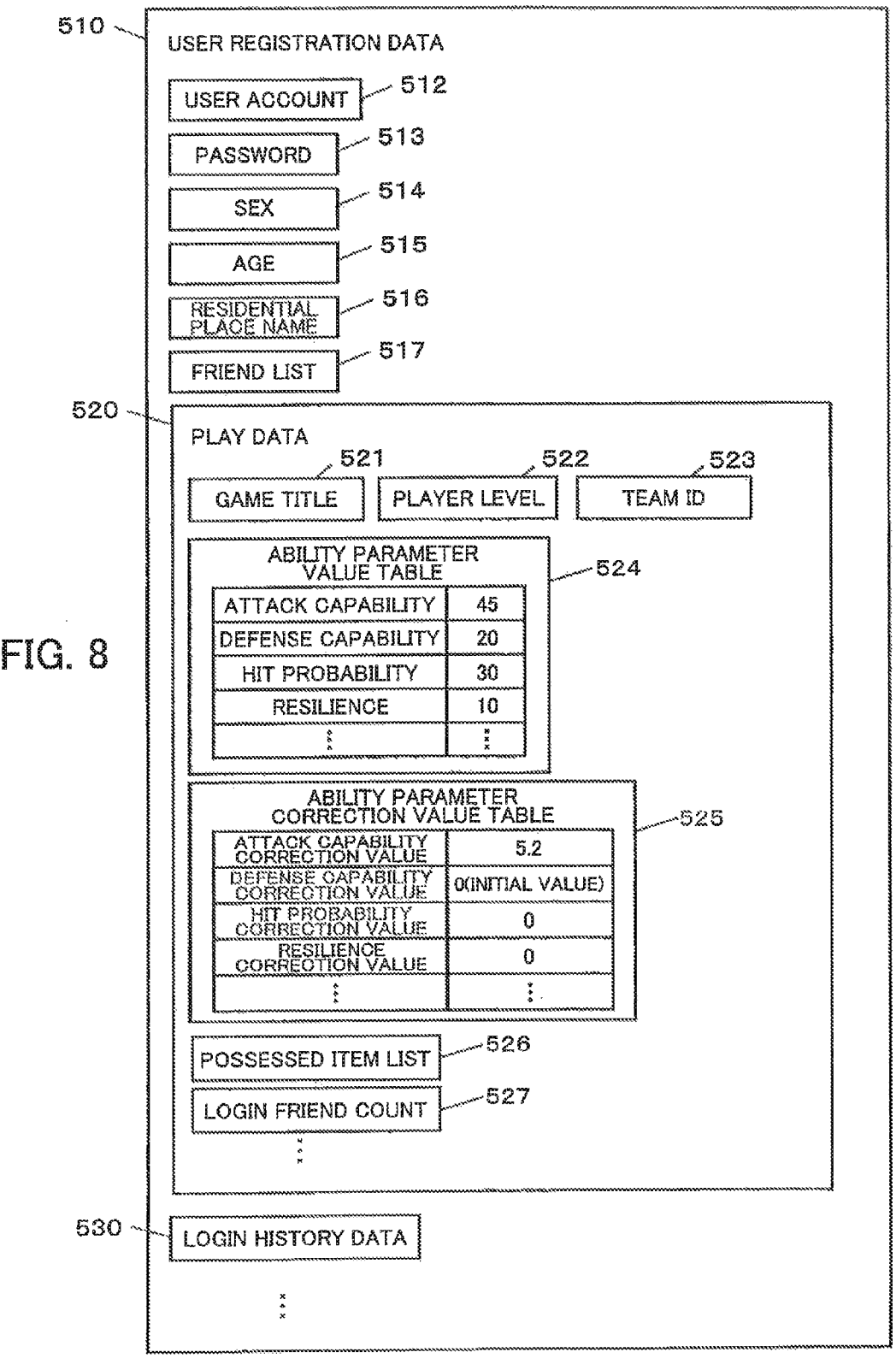
FIG. 8 is a view illustrating an example of the data configuration of user registration data.

The friend list management section 231 implements a function of registering the authenticated player and a plurality of other players corresponding to an operation input performed by the authenticated player (one player) so that the authenticated player is linked to the plurality of other players. In the first embodiment, the plurality of other players linked to the authenticated player are registered as "friends". Note that the plurality of other players linked to the authenticated player may be registered as "teammates" depending on the game. The registration information is stored in the server storage section 500s as the friend list 517 included in the user registration data 510 (see FIGS. 1 and 8).

Note that the friend list management section 231 also has a function of deleting the friend player. The friend player registration/deletion function may be implemented in the same manner as a friend registration function or a teammate registration function employed in a known online game. Therefore, further description thereof is omitted.

The friend list management section 231 also has a function of calculating the non-login duration of the friend player registered in the friend list. The friend list management section 231 may appropriately have a function of prompting the player to delete the friend player from the friend list when the non-login duration has exceeded a given game withdrawal determination reference time (e.g., 2 weeks).

The login processing section 232 controls a login corresponding to a request from the game device 1500 that has connected the game server 1100 via the communication channel. The login processing section 232 may be implemented by appropriately utilizing known login control technology.

The login history management section 233 controls update and management of the login history data 530 about each player. More specifically, the login history management section 233 requests and acquires the login date/time, the position information about the game device 1500 that requests a login, and the like when the user (authenticated player) subjected to the login process has been authenticated, and stores the login date/time and the like as the login history data 530.

The friend login bonus management section 234 controls the friend login bonus-giving process.

For example, the friend login bonus management section 234 performs (1) a process that refers to the friend list of the authenticated player (or a process that acquires information that corresponds to the friend list from an external server (e.g., SNS server) or the like using the user account and the password of the authenticated player), (2) a process that selects a friend player who is referred to when giving the friend login bonus from the friend list of the authenticated player, (3) a process that calculates the individual login points LP and the total login points TLP referring to the login history data 530 about the selected friend player, (4) a process that determines the details of the friend login bonus corresponding to the total login points TLP, (5) a process that gives the friend login bonus to the authenticated player, (6) a process that provides information for the game device 1500 to display the notification screen W6 (see FIG. 6), (7) a process that clocks time by referring to a system clock or acquiring the standard time via the Internet, and the like.

The lottery processing section 235 performs a lottery process. In the first embodiment, the lottery processing section 235 implements a lottery for selecting the friend login bonus from a plurality of options, or a lottery that can be played once after the player has logged in (i.e., a lottery that is executed when the player has touched the lottery icon 22) using random numbers, for example.

The game process control section 236 manages and provides information for the user who has logged in to play the online game. The game process control section 236 may be implemented in the same manner as in a known online game.

The game server control section 201 may also appropriately perform a timing process (e.g., time limit timing process) that utilizes a system clock, a flag management process, and the like. The game server control section 201 may also appropriately perform a data decoding process, a texture decompression process, and the like, as required. Note that the game server control section 201 need not necessarily perform these processes (i.e., these processes may be appropriately added or omitted depending on the game and its implementation mode). These processes may be implemented in the same manner as in a known multi-player online game.

The image generation section 260s is implemented by a processor (e.g., graphics processing unit (GPU) or a digital signal processor (DSP)), a video signal IC, a program (e.g., video codec), a drawing frame IC memory (e.g., frame buffer), a texture data decompression IC memory, and the like. The image generation section 260s generates a screen (image) every frame (e.g., 1/60th of a second) based on the processing results of the server processing section 200s, and outputs image signals of the generated screen (image) to the image display section 360s.

The image display section 360s displays various images based on the image signals input from the image generation section 260s. The image display section 360s may be implemented by an image display device such as a flat panel display, a cathode-ray tube (CRT), a projector, or a head-mounted display. The touch panel 1108 illustrated in FIG. 1 corresponds to the image display section 360s.

The communication control section 270s performs a data communication process, and exchanges data with an external device via the communication section 370s.

The communication section 370s connects to the communication channel 1 to implement communication. The communication section 370s is implemented by a transceiver, a modem, a terminal adapter (TA), a jack for a communication cable, a control circuit, and the like.

The server storage section 500s stores a program and game data that causes the server processing section 200s to implement its functions. The server storage section 500s is used as a work area for the server processing section 200s, and temporarily stores the results of calculations performed by the server processing section 200s based on a program, information received from the game device 1500, and the like. The function of the server storage section 500s is implemented by an IC memory (e.g., RAM and ROM), a magnetic disk (e.g., hard disk), an optical disk (e.g., CD-ROM and DVD), or the like. The information storage medium (e.g., IC memory) provided in the blade server 1104 and the storage 1140 illustrated in FIG. 1 correspond to the server storage section 500s.

The server storage section 500s stores a server system program 503, a game server program 505, a game client program 506, game execution data 508, user registration data 510, point calculation target friend selection condition data 550, friend login bonus type setting data 560, and sub-point-giving condition data 570. The server storage section 500s also appropriately stores information (e.g., given period count value and flag) that is required for the game management process, the friend login bonus-giving process, and the like.

The server system program 503 causes a computer to implement the basic functions of a server.

The game server program 505 causes the server processing section 200s to implement the functions of the game server control section 201.

The game client program 506 is an original client program provided to the game device 1500 that has issued a game participation request. The game device 1500 stores the game client program 506 downloaded from the game server 1100 in the information storage medium provided therein, and executes the game client program 506. The game client program 506 is implemented by a dedicated program, a plug-in that implements dynamic display on a web browser program, or the like. A plug-in that implements dynamic display on a web browser program may be used when implementing the online game as a browser game.

The game execution data 508 includes various types of data that are necessary when executing the online game. For example, the game execution data 508 includes data for setting a game field, model data and motion data about the player character and an enemy character, texture data, the initial ability parameter value of each character, setting data about an item that can be used in the game, and the like.

The user registration data 510 is provided corresponding to each player, and includes various types of information about the player. For example, the user registration data 510 includes a user account 512 and a password 513 that are necessary for a login (see FIG. 8). The user registration data 510 may include sex 514, age 515, a residential place name 516, and the like as personal information about the player. Note that the personal information about the player is not limited thereto, and other type of personal information may be appropriately set.

The user registration data 510 also includes the friend list 517 that includes the S5 user account 512 of another player who is a friend of the player, play data 520, and the login history data 530.

The play data 520 includes a game title 521, a player level 522 that is automatically determined by the game result, the cumulative play time, and the like, a team ID 523, an ability parameter value table 524, an ability parameter correction value table 525, a possessed item list 526, a login friend count 527, and the like.

The play data 520 may also appropriately include data corresponding to the game, such as the character type of the player character, map data, the current map ID, the current position on the map, the date/time in the game world, and the match record. The team ID 523 can be omitted depending on the game.

The ability parameter value table 524 includes the ability parameter value of the player character (e.g., a team and an army operated by the player, a breeding target character, or a love-interest character).

The ability parameter correction value table 525 includes a correction value for the ability parameter stored in the ability parameter value table 524 during game play. In the first embodiment, the correction value is initialized to "0" each time a login occurs. When correction of the ability parameter has been selected as the friend login bonus, the correction value is updated with a correction value calculated corresponding to the total login points TLP (see FIG. 4). The correction value stored in the ability parameter correction value table 525 is used as the original ability parameter value stored in the ability parameter value table 524 until a logout occurs.

The login history data 530 includes login information about the player.

Figure 9:
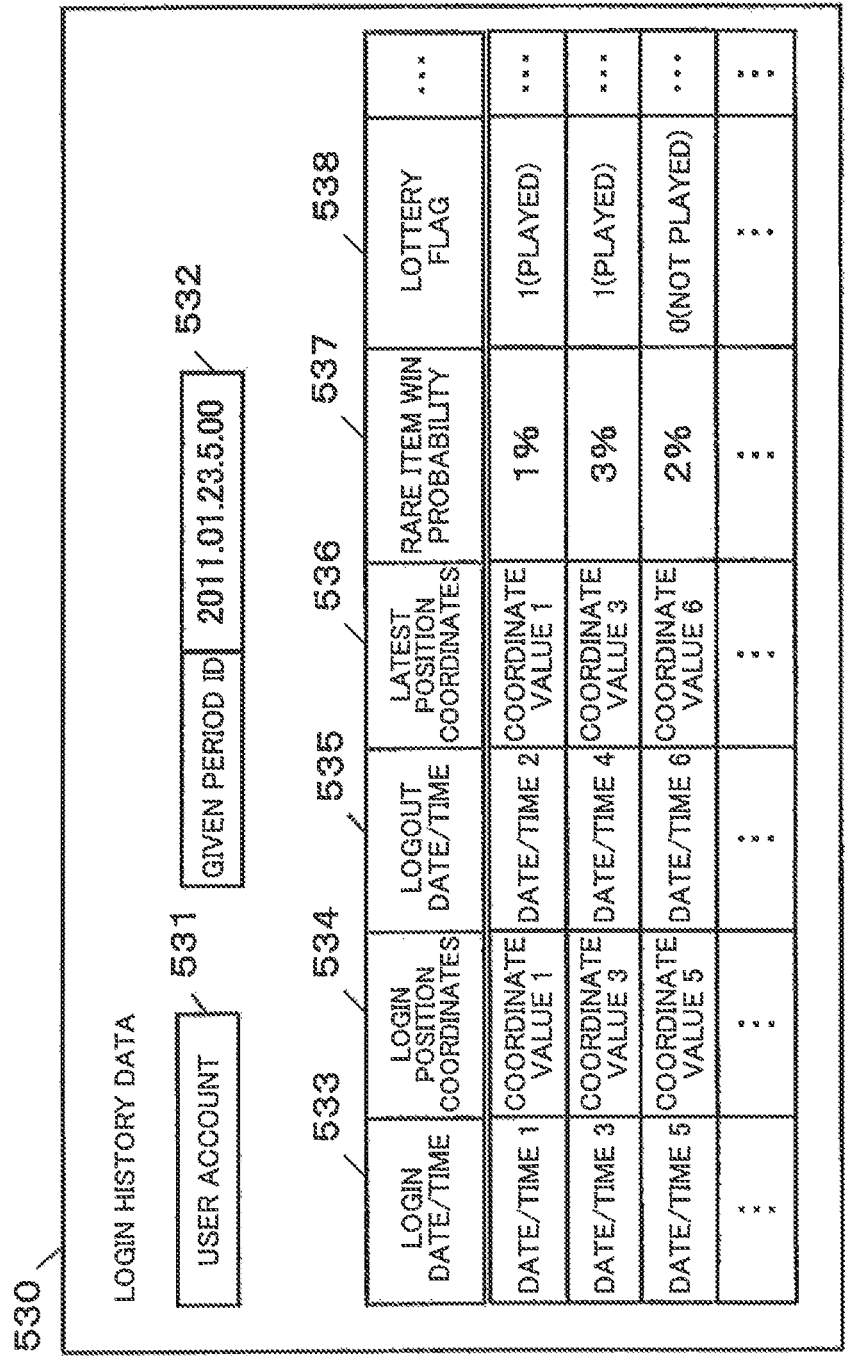
FIG. 9 is a view illustrating an example of the data configuration of login history data.

For example, the login history data 530 includes a user account 531 and a given period ID 532 (see FIG. 9). The given period ID 532 is identification information that indicates the start date/time of the given period that is applied when giving the friend login bonus to the player. The given period ID 532 is automatically updated when the next given period starts. The login history data 530 also includes a login date/time 533, login position coordinates 534, a logout date/time 535, latest position coordinates 536, rare item win probability 537, and a lottery flag 538.

The position information that is acquired from the game device 1500 during the login process is stored as the login position coordinates 534.

The position information that is regularly acquired from the game device 1500 after the login process is stored as the latest position coordinates 536.

The rare item win probability in a lottery that can be played once after the player has logged in is stored as the rare item win probability 537. The initial value is stored as the rare item win probability 537 at a timing at which a new login date/time 533 has been registered, and the rare item win probability 537 is changed when giving the friend login bonus.

The lottery flag 538 is set to "1" when the player has played a lottery that can be played once after the player has logged in.

The point calculation target friend selection condition data 550 includes a condition for selecting a friend player whose login history data 530 is referred to for giving the friend login bonus.

For example, the point calculation target friend selection condition data 550 includes an applied condition 551 and a friend player selection condition 552 (see FIG. 10). In the first embodiment, the player level 522 (see FIG. 8) and the number of registered friends are used as parameters of the applied condition 551 so that the friend player selection condition 552 becomes more stringent (i.e., the number of friend players to be selected decreases) as the player level and the number of registered friends increase. For example, the friend player selection condition "login position is close" means selecting a friend player whose login position coordinates 534 or latest position coordinates 536 included in the login history data 530 indicate a position within a given range (e.g., a range having a radius of 50 km) around the position coordinates acquired from the game device 1500 of the authenticated player during the login process. When a plurality of friend player selection conditions 552 are set, one of the plurality of friend player selection conditions 552 is selected by a lottery.

Note that the parameter of the applied condition 551 and the friend player selection condition 552 are not limited to those illustrated in FIG. 10, and an appropriate user-related parameter may be used.

The friend login bonus type setting data 560 includes n types of friend login bonus. For example, the friend login bonus type setting data 560 includes a bonus-giving condition 561 that utilizes the total login points TLP, and a bonus type 562 (see FIG. 11).

In the first embodiment, the total login points TLP (see FIG. 4) are used as a parameter of the bonus-giving condition 561.

The individual login points LP that are used to calculate the total login points TLP include the login history points P1 that are given when the friend player has logged in within the given period. Therefore, the friend login bonus management section 234 functions as a login player count-based bonus change means that changes the bonus given to the authenticated player based on the number of friend players (other players registered as a friend) who have substantially logged in within the given period.

The individual login points LP also include the login count points P2 that increase as the login count within the given period increases. Therefore, the friend login bonus management section 234 functions as a login count-based bonus change means that changes the bonus given to the authenticated player based on the login count of the friend player within the given period.

The individual login points LP also include the login date/time points P3 that are given when it has been determined that a login history that satisfies a date/time condition (e.g., time zone or date) that can be arbitrarily set by the game administrator exists. Therefore, the friend login bonus management section 234 functions as a specific date/time login-based bonus change means that changes the bonus given to the authenticated player based on the number of friend players whose login date/time satisfies a given date/time condition.

The individual login points LP also include the login position points P4 that are given when it has been determined that the login position of the friend player satisfies a given position condition. Therefore, the friend login bonus management section 234 functions as a specific login position-based bonus change means that changes the bonus given to the authenticated player based on the number of friend players whose login position information satisfies a given position condition.

Note that the setting value of the total login points TLP used as the bonus-giving condition 561 may be appropriately changed. When a plurality of bonus types 562 are set corresponding to one bonus-giving condition 561, one of the plurality of bonus types 562 is selected by a lottery each time the friend login bonus is given to the player.

The sub-point-giving condition data 570 (see FIG. 7) defines conditions whereby the sub-points P1, P2, ... of the individual login points LP are given (see FIG. 4). For example, the sub-point-giving condition data 570 includes the upper-limit value of the total login count m used to calculate the login count points P2, data that defines the date/time condition whereby the login date/time points P3 are given, and data that defines the position condition (e.g., position coordinate range) whereby the login position points P4 are given. Note that the sub-point-giving condition data 570 may appropriately include other type of information depending on the method that calculates the individual login points LP.

Process Flow

Figure 12:
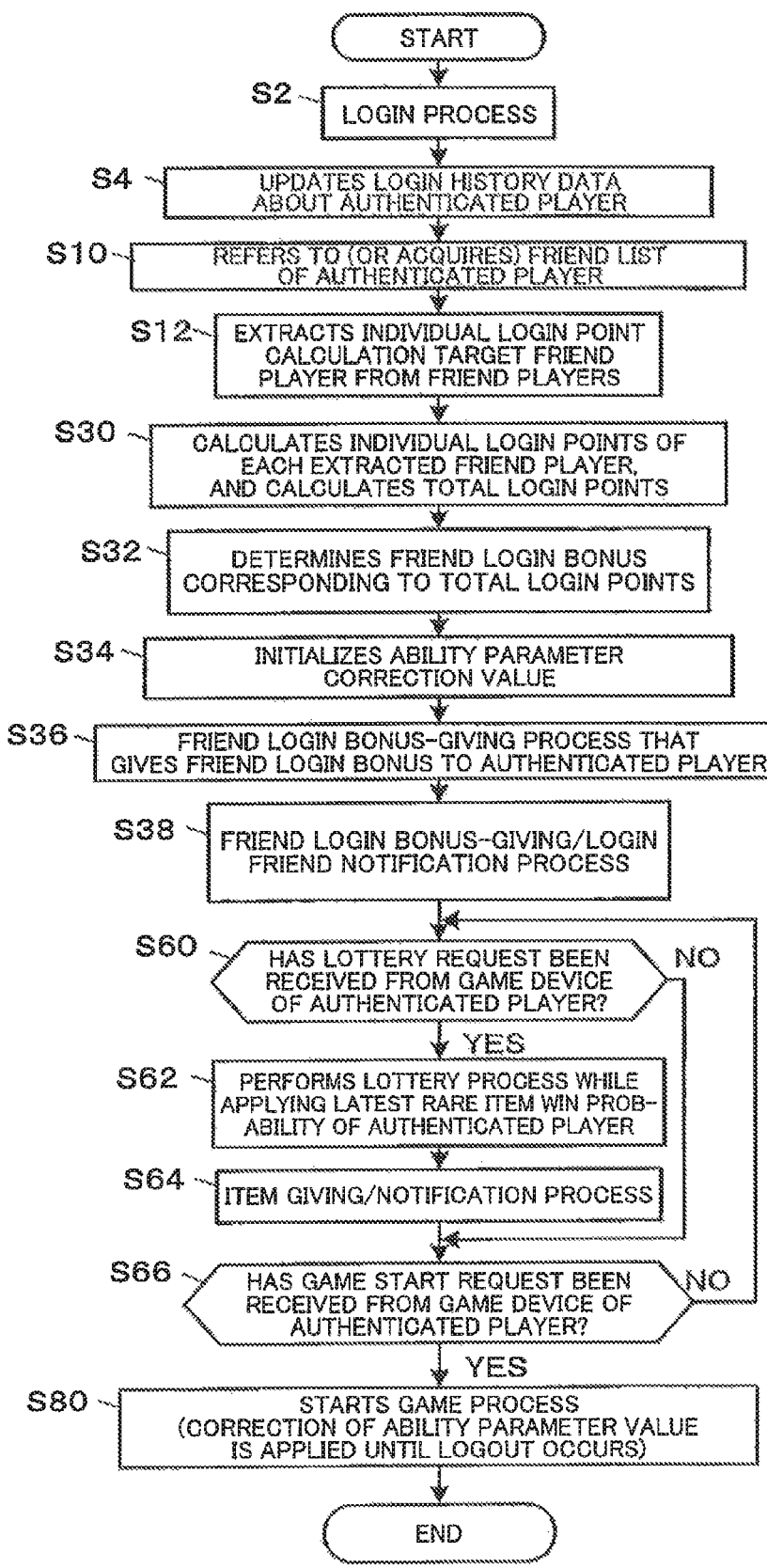
FIG. 12 is a flowchart illustrating the flow of a process including a login process and a friend login bonus-giving process performed by a game server according to the first embodiment.

The flow of the process (including the login process and the friend login bonus-giving process) performed by the game server 1100 is described below with reference to FIG. 12. The following description is given on the assumption that the player has acquired the user account, and played the game many times, and the user accounts of a plurality of other players are registered in the friend list 517.

When the server processing section 200s of the game server 1100 have received a login request from the game device 1500 that is connected to the game server 1100 via the communication channel, the server processing section 200s performs the login process (step S2).

The login screen W4 is displayed on the game device 1500 (see FIG. 5) when the server processing section 200s has performed the login process. When the player has input the user account and the password on the login screen W4, the user account and the password input by the player, and the latest position information acquired by the game device 1500 are transmitted from the game device 1500 to the game server 1100. The game server 1100 performs the authentication process using the user account and the password received from the game device 1500.

When the authentication process has completed, the server processing section 200s of the game server 1100 adds the new login history to the login history data 530 included in the user registration data 510 about the authenticated user (authenticated player) (i.e., updates the login history data 530) (step S4).

More specifically, the server processing section 200s stores the current date/time as the login date/time 533, and stores the latest position information received from the game device 1500 together with the user account and the password as the login position coordinates 534 and the latest position coordinates 536. The logout date/time 535 is set to the initial value, and is changed to the date/time when the logout process has been performed or the date/time when it has been determined that the player has logged out. The rare item win probability 537 is set to a given initial value, and the lottery flag 538 is set to "0 (not played)".

The server processing section 200s of the game server 1100 refers to the friend list 517 of the authenticated player (step S10), and selects the individual login point LP calculation target friend player from the users (friend players) registered in the friend list 517 (step S12). More specifically, the server processing section 200s refers to the point calculation target friend selection condition data 550, and selects the friend player selection condition 552 that corresponds to the applied condition 551 that is satisfied by the player level 522 and/or the number of friends of the authenticated player (see FIG. 10). The server processing section 200s then extracts the friend player who satisfies the selected friend player selection condition 552. The server processing section 200s extracts the friend player by determining whether or not the friend player selection condition 552 is satisfied referring to the user registration data 510 (particularly the login history data 530) about each friend player.

The server processing section 200s then calculates the individual login points LP of each extracted friend player, and calculates the total login points TLP (step S30 (see FIG. 4)). In this case, the login friend count 527 of the authenticated player may be updated.

The server processing section 200s determines the friend login bonus corresponding to the total login points TLP (step S32). More specifically, the server processing section 200s refers to the friend login bonus type setting data 560, and selects the bonus type 562 that corresponds to the bonus-giving condition 561 that is satisfied by the total login points TLP. The number of bonus types to be selected may be appropriately set.

The server processing section 200s then initializes each value stored in the ability parameter correction value table 525 to "0" (step S34), and performs the friend login bonus-giving process that gives the friend login bonus to the authenticated player (step S36).

More specifically, when the bonus type 562 selected in the step S32 is correction of the ability parameter value (e.g., "correction of attack capability" or "correction of defense capability" in FIG. 11), the server processing section 200s calculates the ability parameter correction value according to a given function that contains the total login points TLP as a variable. The server processing section 200s sets the calculated correction value as the correction target ability parameter stored in the ability parameter correction value table 525. When the bonus type 562 selected in the step S32 is giving of an item (e.g., "defense item" in FIG. 11), the server processing section 200s randomly selects a defense item, and adds the selected defense item to the possessed item list 526 included in the play data 520. When the bonus type 562 selected in the step S32 is an increase in the rare item win probability (e.g., "rare item win probability+1.2%" in FIG. 11), the server processing section 200s increases (updates) the latest probability value (default value at this stage) of the rare item win probability 537 included in the login history data 530 about the authenticated player.

The server processing section 200s then performs the friend login bonus-giving/login friend notification process (step S38). More specifically, the server processing section 200s generates information for the game device 1500 of the authenticated player to display the notification screen W6 (see FIG. 6), or selects information provided in advance corresponding to the friend login bonus, and transmits the information to the game device 1500.

When the authenticated player has touched the lottery icon 22 when the notification screen W6 is displayed on the game device 1500 of the authenticated player, a lottery request is transmitted from the game device 1500 to the game server 1100.

When the server processing section 200s has received the lottery request (YES in step S60), the server processing section 200s refers to the latest rare item win probability 537 included in the login history data 530 about the authenticated player. The server processing section 200s performs the lottery process while applying the win probability (step S62), and performs the item giving/notification process corresponding to the lottery result (step S64).

More specifically, the server processing section 200s transmits data for the game device 1500 of the authenticated player to display the lottery screen W8 to the game device 1500, and also transmits data for the game device 1500 to display the state of the lottery and data for the game device 1500 to display the item selected by the lottery on the lottery screen W8. The server processing section 200s adds the item selected by the lottery to the possessed item list 526, and sets the latest lottery flag 538 included in the login history data 530 about the authenticated player to "1 (played)".

When the authenticated player has touched the game start icon 24 (see FIG. 6) when the notification screen W6 is displayed on the game device 1500 of the authenticated player, a game start request is transmitted from the game device 1500 to the game server 1100.

When the server processing section 200s has received the game start request (YES in step S66), the server processing section 200s starts the game process (step S80). More specifically, the processing section 200s resumes the game from the timing stored in the play data 520.

According to the first embodiment, a bonus is given to the authenticated player corresponding to the login history of the friend player within the given period (e.g., from 5:00 on the day to 5:00 on the next day). The player can obtain a bonus corresponding to the number of friends who have logged in each time the player has logged in. This prompts the player to log in more often.

Since the value of the bonus increases when the player logs in within the latter half of the given period (e.g., one day), it is possible to prompt the player to log in within the latter half of the given period. Specifically, since the number of players of the online game who log in within the latter half of the given period increases, the possibility that the player can meet and play with another player online increases as compared with a related-art online game that is designed so that each player logs in at his convenience. This also prompts the player to log in more often.

It is also possible to prompt the player to log in at a relatively early time within the given period in order to leave a login history that contributes to a bonus given to his friend when the friend has logged in instead of obtaining an advantage due to the login history of the friend. This provides a login with a meaning, and motivates the player to log in. The first login time is displayed within the notification screen W6 corresponding to each user account. Therefore, since another player is informed of the player's early-time login effort, it is possible to further motivate the player to log in.

The user will feel a sense of affinity to another user when the user sees the login time of the other user. This causes the player to develop a sense of unity with the friend player even if the player is not acquainted with the friend player, and prompts the player to continuously play the online game.

Note that it is also possible to employ a configuration in which the player can obtain the login bonus only once within the given period (24 hours in the first embodiment). More specifically, a first login determination step that determines whether or not the current login is the first login within the given period referring to the login history data 530 about the authenticated player may be provided before the step S10, the step S10 may be performed when it has been determined that the current login is the first login within the given period, and the steps S10 to S38 may be skipped when it has been determined that the current login is not the first login within the given period.

This makes it possible to limit giving of the friend login bonus. On the other hand, since the player can obtain the friend login bonus based on the number of friend players who have logged in within the given period when the player has logged in at a timing close to the end timing of the given period, the player can obtain a big bonus at one time.

When limiting giving of the friend login bonus, it is also possible to employ a configuration in which a bonus based on a login of an identical friend user is given to the player only once within the given period. More specifically, the first login determination step that determines whether or not the current login is the first login within the given period may be provided before the step S10, the steps S10 and S12 may be performed when it has been determined that the current login is the first login within the given period, and the extraction list of the friend players extracted in the step S12 may be stored as the play data 520 until the given period elapses. The step S30 may be replaced with a step that calculates the individual login points of each friend player registered in the extraction list, and removes the friend player whose individual login points have been calculated from the extraction list. According to the above configuration, since a bonus that corresponds to the friend player 2c has been given to the player when the player has logged in at 10:00 (first login) in the example illustrated in FIG. 3, a bonus that corresponds to the friend players 2*b* and 2*d* is given to the player when the player has logged in at 19:30 (second login), and a bonus that corresponds to the friend player 2*e* is given to the player when the player has logged in at 23:00 (third login).

Alternatively, a step that stores the friend login bonus-giving time (i.e., the time at which the friend login bonus was given) as the play data 520 may be provided after the step S36, a step that determines whether or not a given giving-limiting time (e.g., 2 hours) has elapsed from the friend login bonus-giving time may be provided before the step S10, the step S10 may be performed when it has been determined that the given giving-limiting time has elapsed from the friend login bonus-giving time, and the steps S10 to S38 may be skipped when it has been determined that the given giving-limiting time has not elapsed from the friend login bonus-giving time. This makes it possible to prevent a situation in which a bonus is given to the player when the player has logged in again at a time interval shorter than the given giving-limiting time.

In this case, a parameter that indicates the state of the game may be used instead of the friend login bonus-giving time. For example, the preceding play time, an increase in the player level 522 (see FIG. 8) during the preceding game play, the number of cleared stages, the number of acquired items, or the like may be used as the parameter, the step S10 may be performed when the parameter has exceeded the reference value, and the steps S10 to S38 may be skipped when the parameter has not exceeded the reference value.

A time limit may be provided to the friend login bonus.

For example, a step that clocks the time limit when the friend login bonus is an increase in rare item win probability may be provided after the step S36, and a step that sets the rare item win probability to the initial value or the value before the rare item win probability has increased when the clock operation has been completed within the step S80 may be appropriately provided.

Second Embodiment

A second embodiment of the invention is described below. The second embodiment is basically implemented in the same manner as the first embodiment, but differs from the first embodiment as to the basic system configuration and the network type. The following description mainly focuses on the differences from the first embodiment. The same elements as those described in connection with the first embodiment are indicated by identical reference signs, and detailed description thereof is omitted.

Figure 13:
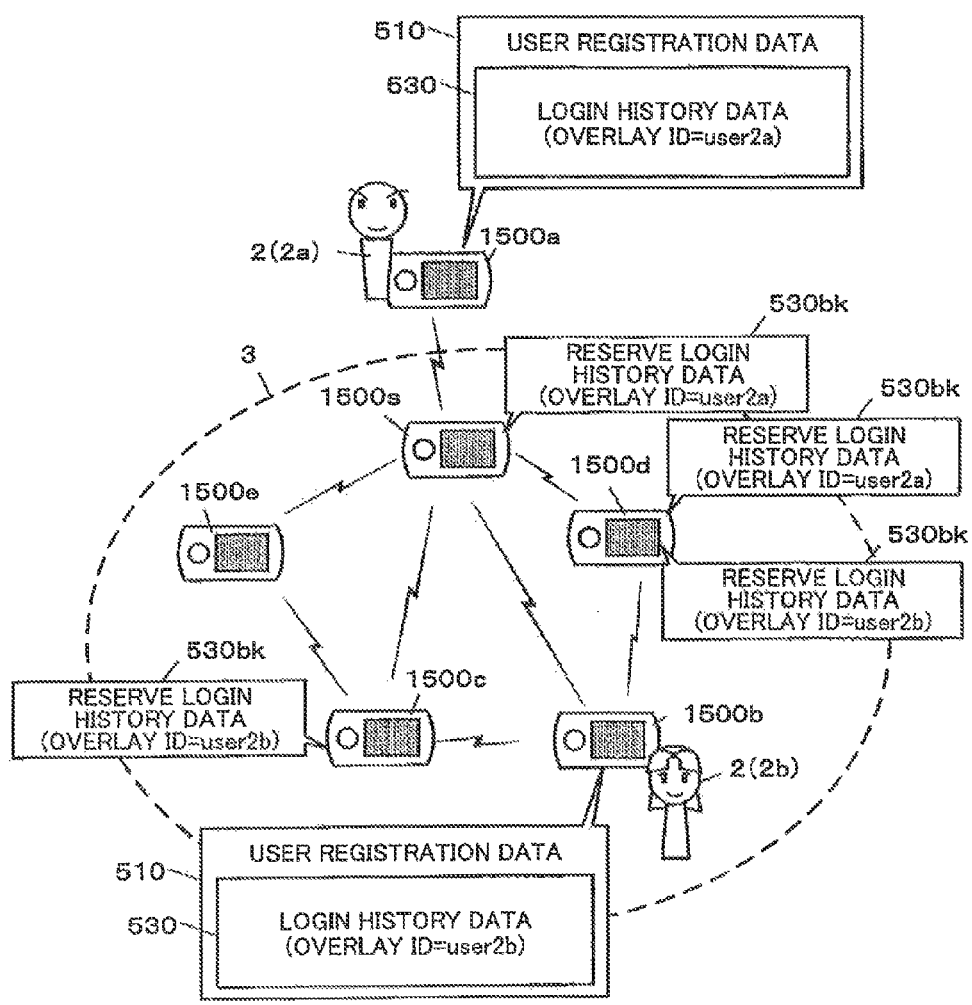
FIG. 13 is a view illustrating an example of the configuration of a game system according to the second embodiment.

FIG. 13 illustrates a configuration example of a game system according to the second embodiment. The first embodiment utilizes a client/server network. In the second embodiment, the game devices 1500 (1500*a*, 1500*b*, ..., and 1500*s*) provided corresponding to each player are connected via a peer-to-peer (P2P) network through a communication line (channel).

In the second embodiment, the user registration data 510 about each player that is stored in and managed by the game server 1100 (see FIG. 1) in the first embodiment, is stored in and managed by each game device 1500. The login history data 530 is included in the user registration data 510. A data-specific overlay ID (identification information on an overlay network) is assigned to the login history data 530. The overlay ID is generated based on the user account 531 and the given period ID 532 included in the login history data 530. For example, a hash value may be generated as the overlay ID from the user account 531 and the given period ID 532.

However, if the login history data 530 is stored only in the game device 1500 of each player, it is impossible to externally refer to the login history data 530 about the player who uses the game device when the game device is off-line (i.e., when the game device is not connected to the network). In this case, it is impossible to correctly calculate the login friend count, and give the friend login bonus to the player.

In the second embodiment, each game device 1500 transmits (provides) the login history data 530 stored therein to another game device that is connected to the game device 1500 via the peer-to-peer network. The other game device that has received the login history data 530 stores the received login history data 530 as reserve login history data 530*bk*. Since the reserve login history data 530*bk* contains the same data as the original login history data 530, the overlay ID of the reserve login history data 530*bk* is the same as that of the original login history data 530. Specifically, each game device 1500 keeps a backup (copy) of the login history data 530 about the friend player so that it is possible to refer to the login history data 530 even when the game device 1500 of the friend player is off-line.

The location of the login history data 530 about the desired friend player (or the reserve login history data 530*bk* stored in another game device as a backup) can be determined by applying a known peer-to-peer network search technique. Specifically, the overlay ID may be generated from the user account 531 and the given period ID 532 of the desired friend player, and data having the generated overlay ID may be searched. When data having the generated overlay ID does not exist, it may be determined that the friend player has not logged in within the given period.

Note that a hybrid peer-to-peer network in which an index server that can always connect to the network is additionally provided by the game operator may be used instead of the pure peer-to-peer network illustrated in FIG. 13.

Figure 14:
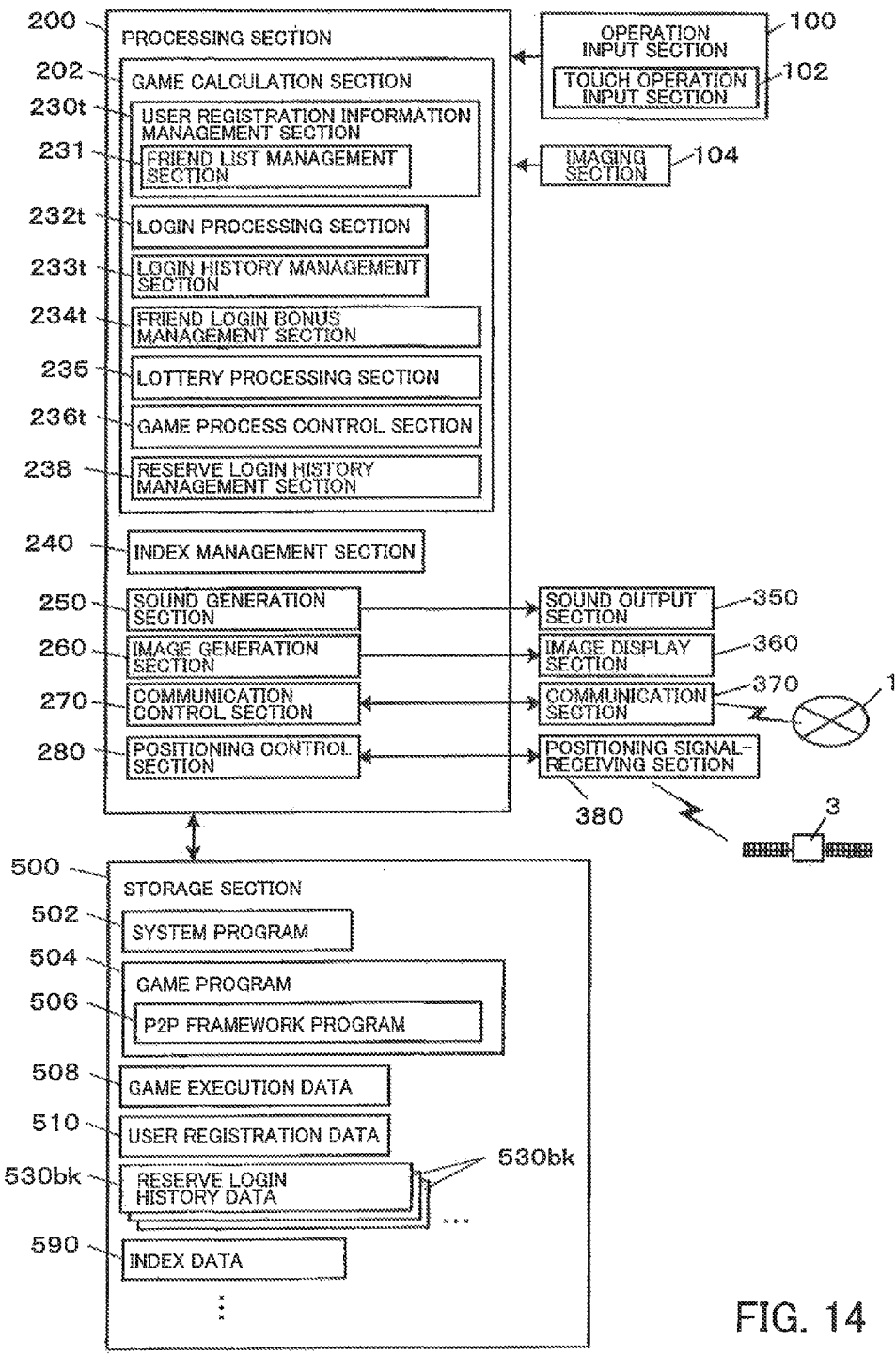
FIG. 14 is a functional block diagram illustrating a functional configuration example of a game device according to the second embodiment.

FIG. 14 is a functional block diagram illustrating an example of the functional configuration of the game device 1500 according to the second embodiment. The game device 1500 according to the second embodiment includes an operation input section 100, an imaging section 104, a processing section 200, a sound output section 350, an image display section 360, a communication section 370, a positioning signal-receiving section 380, and a storage section 500.

The operation input section 100 outputs an operation input signal to the processing section 200 corresponding to an operation input performed by the player. The operation input section 100 may be implemented by a device that is operated directly by the player with a finger (e.g., button switch, joystick, touch pad, or trackball), a device that detects motion or posture (e.g., acceleration sensor, angular velocity sensor, tilt sensor, or terrestrial magnetism sensor), or the like. The arrow key 1502, the home key 1504, and the like illustrated in FIG. 2 correspond to the operation input section 100. The triaxial gyroscope 1556, the triaxial acceleration sensor 1557, and the electronic compass 1555 also correspond to the operation input section 100 when utilizing the values detected by the triaxial gyroscope 1556, the triaxial acceleration sensor 1557, and the electronic compass 1555. The operation input section 100 according to the second embodiment includes a touch operation input section 102 that allows the player to perform an operation input by touching the display screen with a finger or the like. The touch panel 1506 illustrated in FIG. 2 corresponds to the touch operation input section 102.

The imaging section 104 converts light received from the imaging target into an electrical signal to generate digital image data, and outputs the digital image data to the processing section 200. The imaging section 104 may be implemented by a lens, a mechanical shutter, a shutter driver, a photoelectric conversion device (e.g., CCD image sensor module or CMOS image sensor module), a digital signal processor (DSP) that reads the amount of charge from a photoelectric conversion device and generates image data, an IC memory, and the like. The CCD camera module 1516 illustrated in FIG. 2 corresponds to the imaging section 104. Note that the operation input section 100 may include the imaging section 104 when the posture and the body movement of the player are analyzed from the image captured by the imaging section 104 (i.e., when the imaging section 104 is used as an operation input means), or when the imaging place is determined by recognizing the background of the image captured by the imaging section 104 (i.e., when the imaging section 104 is used as a position information input means).

The processing section 200 is implemented by electronic parts such as a microprocessor (e.g., CPU and GPU), an ASIC, and an IC memory. The processing section 200 exchanges data with each functional section, and performs a calculation process based on a given program, data, the operation input signal from the operation input section 100, a request signal from another computer that is connected via the communication channel, and the like to control the operation of the game device 1500. The control board 1550 illustrated in FIG. 2 corresponds to the processing section 200.

The processing section 200 includes a game calculation section 202, an index management section 240, a sound generation section 250, an image generation section 260, a communication control section 270, and a positioning control section 280.

The game calculation section 202 performs a control process for executing the online game that utilizes peer-to-peer connection. For example, the game calculation section 202 disposes a background object in a virtual three-dimensional space to generate a game space, and controls objects (e.g., player character and enemy character) disposed in the game space corresponding to the operation input signal from the operation input section 100. The game calculation section 202 controls a virtual camera that photographs the player character, and causes the image generation section 260 to generate a game screen (image). The game calculation section 202 moves a map, performs a hit determination process and a damage determination process, and controls an NPC. The game calculation section 202 may also appropriately perform a timing process (e.g., time limit timing process) that utilizes a system clock, a flag management process, and the like. The game calculation section 202 may also appropriately perform a decoding process, a texture decompression process, and the like, as required. Note that the game calculation section 202 need not necessarily perform these processes (i.e., these processes may be appropriately added or omitted depending on the game and its implementation mode). These processes may be implemented in the same manner as in a known online game.

The game calculation section 202 includes a user registration information management section 230*t*, a login processing section 232*t*, a login history management section 233*t*, a friend login bonus management section 234*t*, a lottery processing section 235, a game process control section 236*t*, and a reserve login history management section 238.

The user registration information management section 230*t* has a function similar to that of the user registration information management section 230 according to the first embodiment. Specifically, the user registration information management section 230*t* performs a user information acquisition/registration management process (e.g., a process that issues a new user account or registers a password). In the second embodiment, the friend list management section 231 edits the friend list 517 corresponding to an operation input performed by the player, and stores the friend list 517 in the storage section 500.

The login processing section 232*t* corresponds to the login processing section 230 according to the first embodiment. Specifically, the login processing section 232*t* displays the login screen W4 that prompts the user to input the user account and the password, and performs the user authentication process.

The login history management section 233*t* corresponds to the login history management section 233 according to the first embodiment. The login history management section 233*t* controls update and management of the login history data 530 about each player.

More specifically, the login history management section 233*t* performs (1) a process that generates and updates the given period ID 532 when the next given period starts, (2) a process that generates and updates the overlay ID from the user account 531 and the given period ID 532 when the given period ID 532 has changed, (3) a process that registers a new login date/time 533 when the user subjected to the login process has been successfully authenticated, and sets the corresponding parameter values (e.g., login position coordinates 534 (see FIG. 9)), a parameter value update process, and the like.

The friend login bonus management section 234*t* corresponds to the friend login bonus management section 234 according to the first embodiment. The friend login bonus management section 234*t* controls the friend login bonus-giving process.

More specifically, the friend login bonus management section 234*t* performs (1) a process that refers to the friend list 517 of the authenticated player (or a process that acquires information that corresponds to the friend list 517 from an external server or the like using the user account and the password of the authenticated player), (2) a process that selects a friend player who is referred to when giving the friend login bonus from the friend list 517 of the authenticated player, (3) a process that searches and acquires the login history data 530 or the reserve login history data 530*bk* about the selected friend player from another game device that is connected via the peer-to-peer network, (4) a process that calculates the individual login points LP and the total login points TLP based on the acquired login history data 530 or reserve login history data 530*bk*, (5) a process that determines the details of the friend login bonus corresponding to the total login points TLP, (6) a process that gives the friend login bonus to the authenticated player, (7) a process that displays the notification screen W6 (see FIG. 6), (8) a process that clocks and updates the given period by referring to a system clock or acquiring the standard time via the Internet, and initializes the parameters upon update, and the like.

The game process control section 236*t* corresponds to the game process control section 236 according to the first embodiment. The game process control section 236*t* controls execution of the peer-to-peer online game played by the user who has logged in.

The reserve login history management section 238 provides the login history data 530 about the authenticated player that has been updated when the player has logged in to another game device 1500 that is connected via the peer-to-peer network. When the login history data 530 has been received from another game device, the reserve login history management section 238 generates the overlay ID from the user account 531 corresponding to the received login history data 530 and the given period ID 532. The reserve login history management section 238 stores a copy of the received login history data 530 in the storage section 500 as the reserve login history data 530*bk* so that the reserve login history data 530*bk* is linked to the overlay ID.

The index management section 240 updates and manages peer-to-peer index data 590. For example, the index management section 240 updates the index data 590 when the login history management section 233*t* has updated the login history data 530, or when the reserve login history management section 238 has stored new reserve login history data 530*bk* in the storage section 500.

The sound generation section 250 is implemented by a processor (e.g., digital signal processor (DSP) or sound synthesis IC), an audio codec that can reproduce a sound file, and the like. The sound generation section 250 generates sound signals of a game effect sound, background music (BGM), or an operation sound based on the processing results of the game calculation section 202, and outputs the generated sound signals to the sound output section 350.

The sound output section 350 is implemented by a device that outputs a game effect sound, BGM, a telephone voice, and the like based on the sound signals input from the sound generation section 250. The speaker 1510 illustrated in FIG. 2 corresponds to the sound output section 350.

The image generation section 260 is implemented by a processor (e.g., graphics processing unit (GPU) or a digital signal processor (DSP)), a video signal IC, a program (e.g., video codec), a drawing frame IC memory (e.g., frame buffer), a texture data IC memory, and the like. The image generation section 260 according to the second embodiment generates a game screen (image) every frame (e.g., 1/60th of a second) based on the processing results of the game calculation section 202, and outputs image signals of the generated game screen (image) to the image display section 360.

The image display section 360 displays a game image based on the image signals input from the image generation section 260. The image display section 360 may be implemented by an image display device such as a flat panel display, a cathode-ray tube (CRT), a projector, or a head-mounted display. The touch panel 1506 illustrated in FIG. 2 corresponds to the image display section 360.

The communication control section 270 performs a data communication process to exchange data with an external device via the communication section 370. In the second embodiment, the communication control section 270 implements peer-to-peer communication connection.

The communication section 370 connects to the communication line 1 to implement communication. The communication section 370 may be implemented by a transceiver, a modem, a terminal adapter (TA), a jack for a communication cable, a control circuit, and the like. The wireless communication module 1553 illustrated in FIG. 2 corresponds to the communication section 370.

The positioning control section 280 performs a control process (i.e., positioning calculation process and positioning calculation result management process) that calculates position information from a signal obtained from a positioning system via the positioning signal-receiving section 380. The GPS module 1554 illustrated in FIG. 2 corresponds to the positioning control section 280.

The positioning signal-receiving section 380 receives information (e.g., GPS signal) provided by a positioning system (e.g., GPS). The GPS antenna 1514 illustrated in FIG. 2 corresponds to the positioning signal-receiving section 380. When utilizing the position information about the mobile phone base station for the positioning calculation process, or communicating with a mobile phone base station, the wireless communication module 1553 that performs wireless communication with a base station also corresponds to the positioning signal-receiving section 380.

The storage section 500 stores a program, data, and the like that implement a function of causing the processing section 200 to integrally control the game device 1500. The storage section 500 is used as a work area for the processing section 200, and temporarily stores the results of calculations performed by the processing section 200 based on a program, data input from the operation input section 100, and the like. The function of the storage section 500 is implemented by an IC memory (e.g., RAM and ROM), a magnetic disk (e.g., hard disk), an optical disk (e.g., CD-ROM and DVD), or the like. The IC memory 1552 included in the control board 1550 and the memory card 1540 illustrated in FIG. 2 correspond to the storage section 500.

The storage section 500 according to the second embodiment stores a system program 502, a game program 504, game time data 508, the user registration data 510, the reserve login history data 530*bk*, and the index data 590. The storage section 500 also appropriately stores data that is generated during the game and updated at any time, the position information obtained using the positioning system, data necessary when performing each process (e.g., decompressed texture data, elapsed time, timer value, counter value, and flag), and the like.

The system program 502 implements the basic functions of the game device 1500 (computer).

The game program 504 causes the processing section 200 to implement the functions of the game calculation section 202. In the second embodiment, the game program 504 includes a P2P framework program 506 that forms a peer-to-peer network with another game device that is executing the game program 504 by utilizing an application layer.

Note that the game program 504 may be downloaded from a given server before starting the game, or may be stored in the memory card 1540 that is obtained by the player.

The user registration data 510 is stored corresponding to each player when a plurality of users share the game device.

The index data 590 indicates the user account that corresponds to the login history data 530 (and the reserve login history data 530*bk*), and the game device (peer-to-peer network node) that stores the login history data 530 (and the reserve login history data 530*bk*). More specifically, the index data 590 includes identification information (e.g., IP address, URL, or MAC address) about the game device, and the overlay ID of the login history data 530 and the reserve login history data 530*bk* stored in the game device. Note that the index data 590 need not necessarily include information about all of the peer-to-peer network nodes. The range of the index data 590 is appropriately determined corresponding to the peer-to-peer network configuration and the search technique.

The flow of the process is described below.

Figure 15:
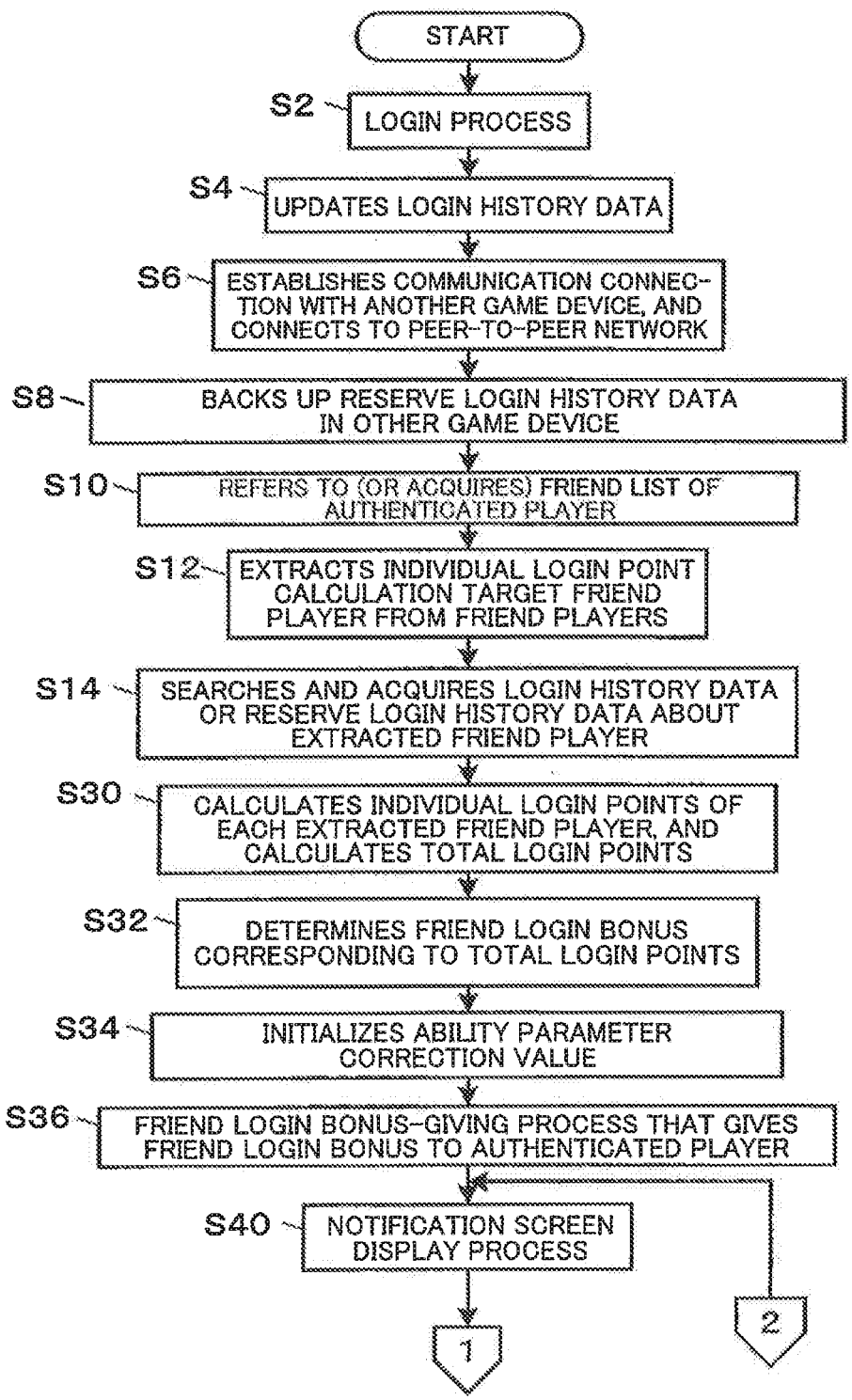
FIG. 15 is a flowchart illustrating the flow of a friend login bonus-giving process performed by a game device according to the second embodiment.
Figure 16:
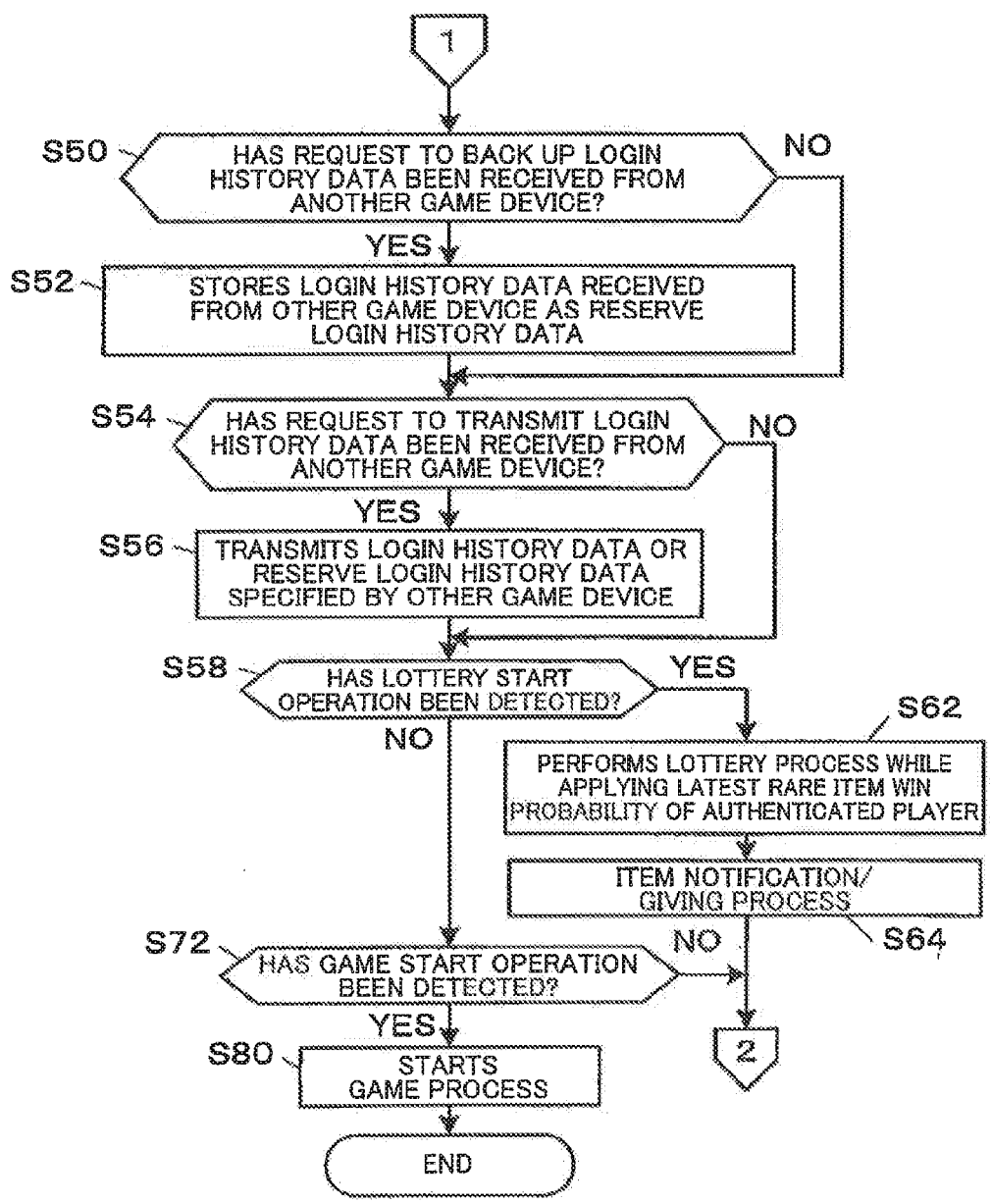
FIG. 16 is a flowchart that follows FIG. 15.

FIGS. 15 and 16 are flowcharts illustrating the flow of the friend login bonus-giving process performed by the game device 1500 according to the second embodiment.

As illustrated in FIG. 15, the processing section 200 of the game device 1500 performs the login process (step S2). Specifically, the processing section 200 displays the login screen W4 that prompts the user to input the user account and the password registered in advance, and performs the user authentication process. When the user authentication process has completed, the processing section 200 updates the login history data 530 about the authenticated player (step S4).

The processing section 200 of the game device 1500 then establishes communication connection with another game device, and connects to the peer-to-peer network that connects the game devices that can execute the same game (step S6). Connection to the peer-to-peer network and the like may be implemented by appropriately utilizing known technology.

The processing section 200 of the game device 1500 then requests the other game device to back up the login history data 530 about the authenticated player that has been updated in the step S4, and transmits the login history data 530 to the other game device, and the other game device stores the received login history data 530 as the reserve login history data 530bk (step S8), Note that the number of connection destination game devices may be appropriately set.

The processing section 200 of the game device 1500 then refers to (or acquires) the friend list 517 of the authenticated player (step S10), and extracts the individual login point LP calculation target friend player from the friend list 517 (step S12).

The processing section 200 searches and acquires the login history data 530 or the reserve login history data 530bk about the extracted friend player (step S14).

More specifically, the processing section 200 issues a data search query to which the overlay ID generated from the user account of the extracted friend player and the current given period ID is attached, to a plurality of adjacent nodes (other game devices) connected via the peer-to-peer network, acquires information about the node that stores the desired history data, and acquires the login history data 530 or the reserve login history data 530bk about the extracted friend player from the node. Since the desired history data cannot be acquired in the step S14 if the extracted friend player has not logged in within the day, a time-out is appropriately provided for the search process.

The processing section 200 then calculates the individual login points LP of each extracted friend player, and calculates the total login points TLP (step S30). Note that the desired history data cannot be acquired in the step S14 if the extracted friend player has not logged in within the day. In this case, the individual login points LP of the friend player are set to "0" or a given value.

The processing section 200 determines the friend login bonus corresponding to the total login points TLP, and gives the friend login bonus to the authenticated player (steps S32 to S36). The processing section 200 then displays the notification screen W6 (step S40).

As illustrated in FIG. 16, when the game device has received a request to back up the login history data 530 from another game device (YES in step S50), the processing section 200 accepts the backup request. Specifically, the processing section 200 stores the login history data 530 received from the other game device in the storage section 500 as the reserve login history data 530bk (step S52). The step S52 corresponds to the step S8. Note that the processing section 200 appropriately updates the index data 590.

When the game device has been accessed by another game device based on a reply to the data search query, and has received a request to transmit the login history data 530 (YES in step S54), the processing section 200 transmits the login history data 530 or the reserve login history data 530bk specified by the other game device (step S56).

When a given lottery start operation has been detected (YES in step S58), the processing section 200 performs the login lottery process while applying the latest rare item win probability 537 of the authenticated player (step S62), and performs the item notification/giving process (e.g., lottery screen W8 display process) (step S64).

When a game start operation input has been detected (YES in step S72), the processing section 200 starts the game.

Modifications

The embodiments to which the invention is applied have been described above. Note that the invention is not limited thereto. Various modifications may be appropriately made, such as adding other elements, omitting some of the elements, or changing some of the elements.

Although the above embodiments have been described taking an example of executing the multi-player online game, the online game may be a single-player online game, or a multi-player or single-player online game other than an RPG. When implementing a game that involves a team battle element, the above embodiments may similarly be applied by replacing the term "friend" with the term "teammate".

Although the above embodiments have been described taking an example in which the total login points TLP are calculated, and the friend login bonus is determined corresponding to the total login points TLP, another configuration may also be employed. For example, the friend login bonus may be determined using the login friend count 527 (i.e., the number of friend players who have logged in for the first time within the given period before the authenticated player has logged in) as the parameter (applied condition parameter) of the bonus-giving condition 561 (see FIG. 17). Alternatively, the friend login bonus may be determined corresponding to the presence or absence or the number of friend players whose login position coordinates 534 satisfy a specific place condition (e.g., within a radius of 2 km around Tokyo Station) within the given period.

In such a case, it is possible to provide a strong login motivation by presenting the condition whereby the bonus is given to the player. Specifically, it is desirable to provide the friend login bonus management section 234 with a function of a bonus-giving condition presentation means that presents the bonus-giving condition to the authenticated player.

Figure 18:
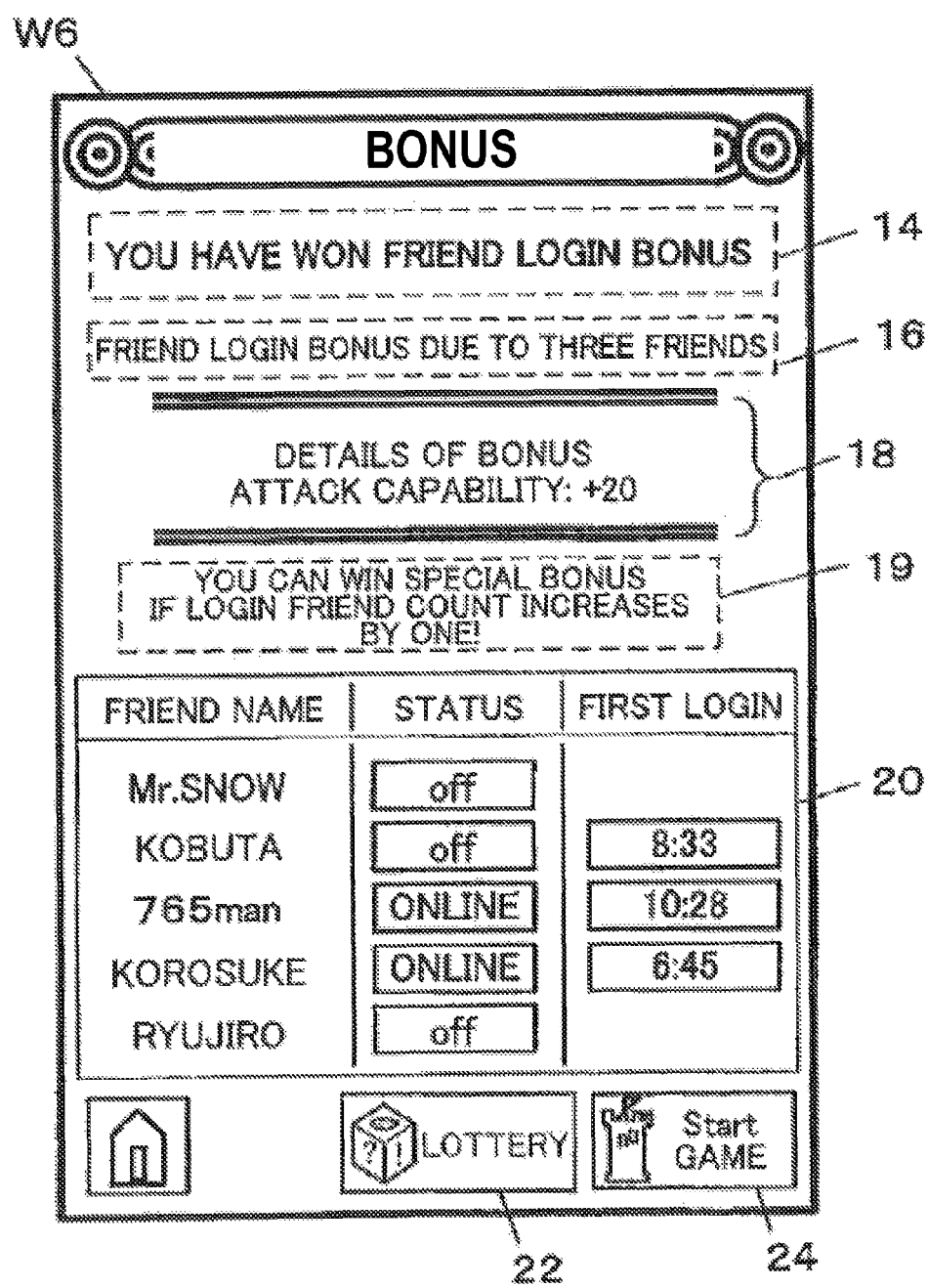
FIG. 18 is a view illustrating a modification of the notification screen.

For example, a bonus-giving condition presentation 19 may be displayed when displaying the notification screen W6 (see FIG. 18). More specifically, bonus-giving condition presentation setting data 563 (see friend login bonus type setting data 560C illustrated in FIG. 17) is stored in the server storage section 500s (first embodiment) or the storage section 500 (second embodiment) so that the bonus-giving condition presentation setting data 563 is linked to the bonus-giving condition 561. In the example illustrated in FIG. 18, text data is set as the bonus-giving condition presentation setting data 563. Note that sound or an image may be used as the bonus-giving condition presentation setting data 563. The server processing section 200s (first embodiment) or the processing section 200 (second embodiment) extracts the bonus-giving condition 561 for which the bonus-giving condition presentation setting data 563 is set and which has not been applied when displaying the notification screen W6, and displays (or outputs sound) the bonus-giving condition presentation setting data 563 that corresponds to one of the extracted bonus-giving conditions 561 or the bonus-giving condition 561 for which the clear condition is closest. Note that the bonus-giving condition presentation setting data 563 may be information (hint) from which the condition can be estimated.

A configuration that separately gives a bonus to the player whose login history data 530 has been referred to as a reward for the friend login bonus may be added to the above embodiments.

Figure 19:
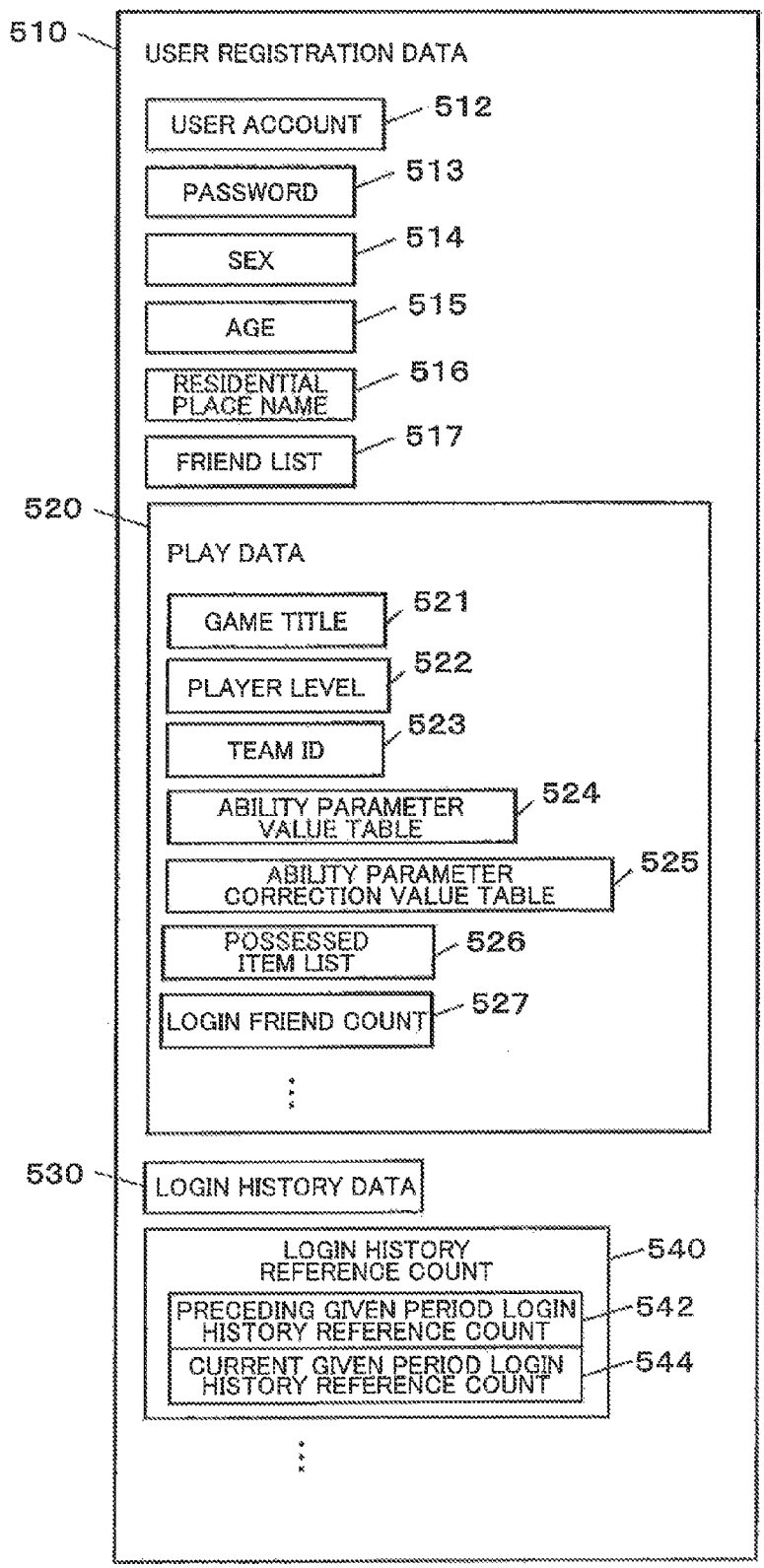
FIG. 19 is a view illustrating a modification of the user registration data.

When applying the above configuration to the first embodiment, a login history reference count 540 is included in the user registration data 510 (see FIG. 19). The number of times in which the login history data 530 about the user has been referred to when giving the friend login bonus to another user is stored as the login history reference count 540 corresponding to each given period. In the example illustrated in FIG. 19, the login history reference count 540 includes a preceding given period login history reference count 542 that indicates the number of times in which the login history data 530 about the user has been referred to within the preceding given period, and a current given period login history reference count 542 that indicates the number of times in which the login history data 530 about the user has been referred to within the current given period.

Figure 20:
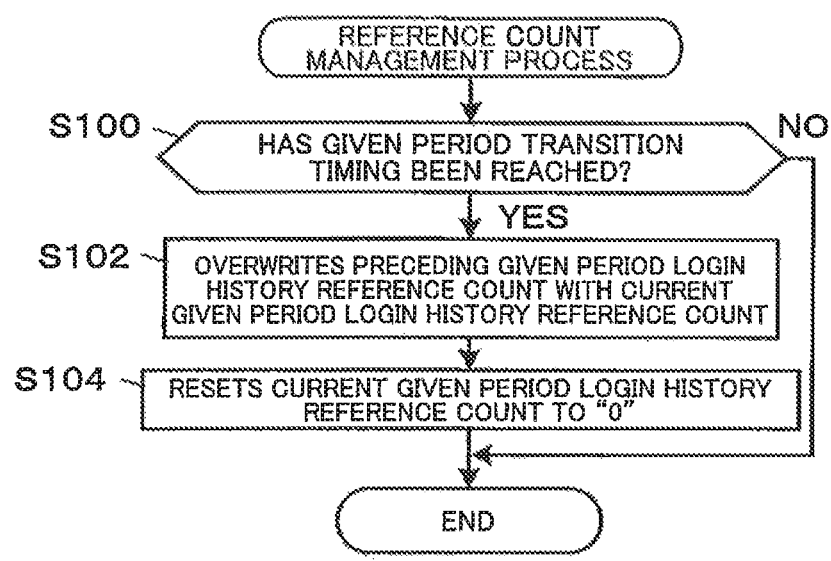
FIG. 20 is a flowchart illustrating the flow of a reference count management process.

In this case, the server processing section 200s of the game server 1100 performs a reference count management process illustrated in FIG. 20. Specifically, when a given period transition timing has been reached (YES in step S100), the server processing section 200s overwrites the preceding given period login history reference count 542 with a current given period login history reference count 544 (step S102), and resets the current given period login history reference count 544 to "0" (step S104).

Figure 21:
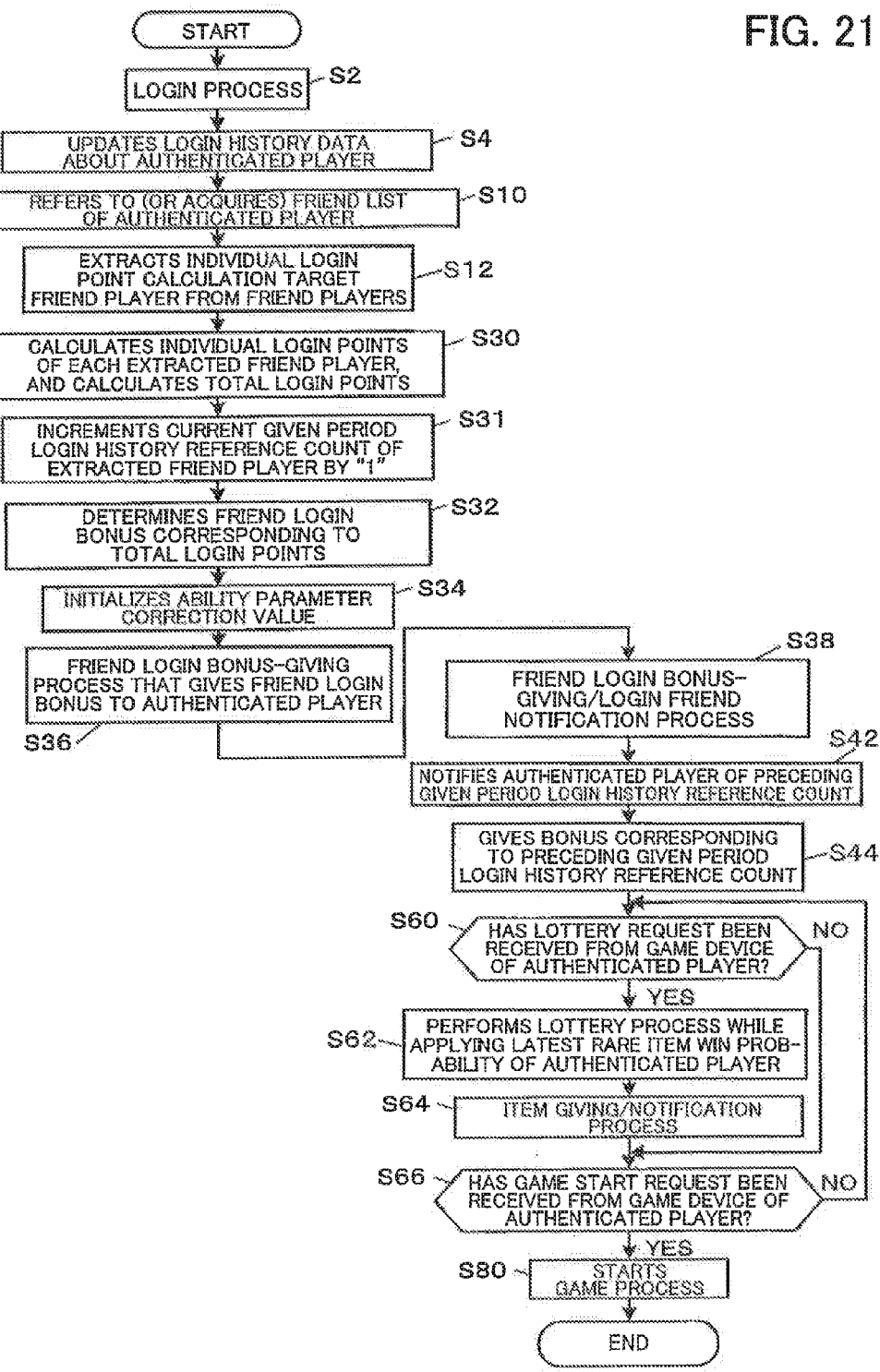
FIG. 21 is a flowchart illustrating the flow of a process including a login process and a friend login bonus-giving process performed by a game server according to a modification.

As illustrated in FIG. 21, the server processing section 200s increments the current given period login history reference count 544 of the extracted friend player by "1" (step S31) after the step S30 when performing the process including the login process and the friend login bonus-giving process. The server processing section 200s notifies the authenticated player of the preceding given period login history reference count 542 (step S42), and gives a bonus (e.g., changing of the parameter value or giving of an item) corresponding to the preceding given period login history reference count 542 to the authenticated player (step S44). Note that a bonus corresponding to the preceding given period login history reference count 542 may be given to the authenticated player only one within each given period, or may be given to the authenticated player each time the authenticated player has logged in.

Figure 22:
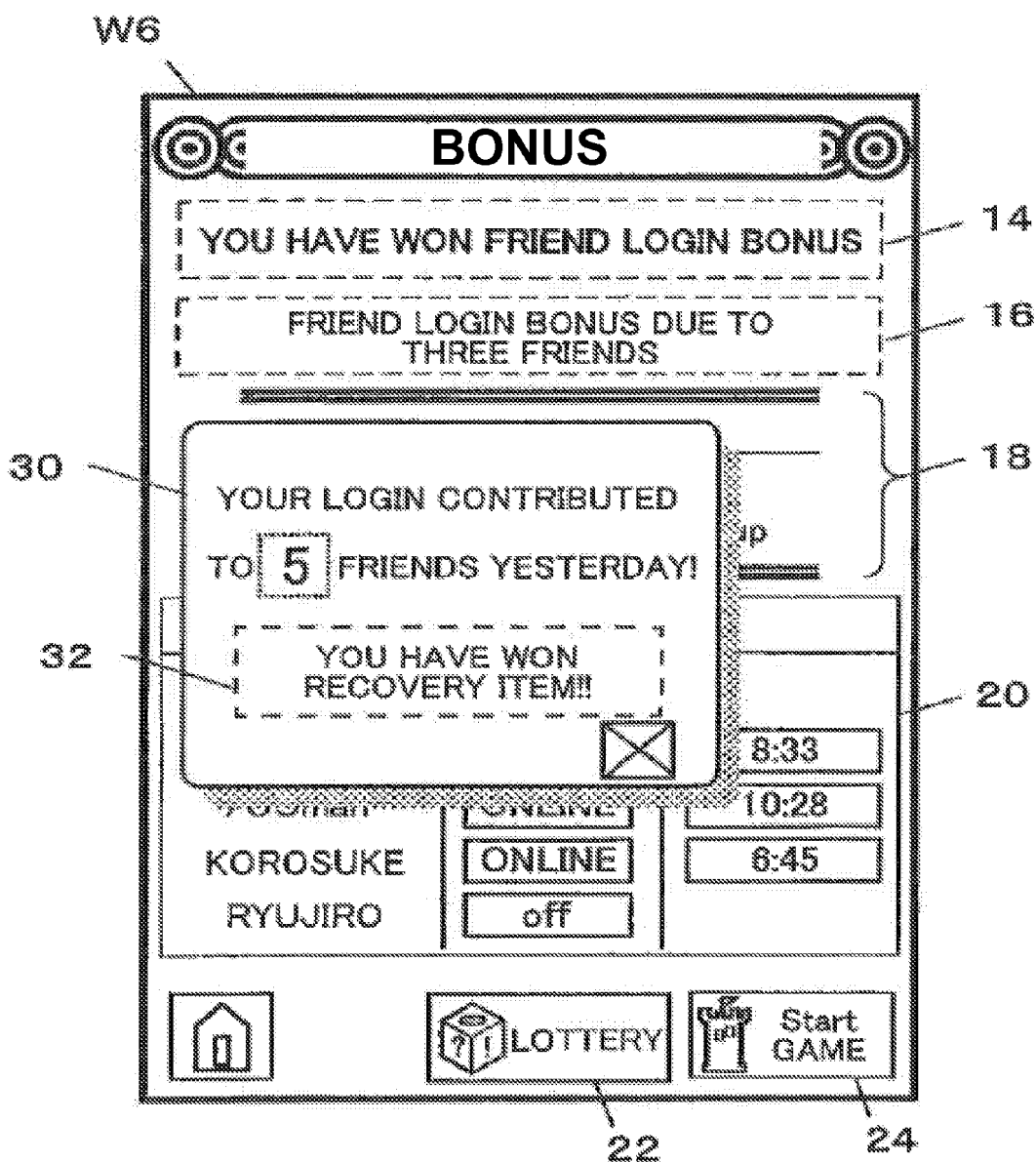
FIG. 22 is a view illustrating an example of a notification screen that includes a reference count notification display.

The preceding given period login history reference count may be notified by displaying a reference count notification display 30 as a pop-up image (i.e., an image that is automatically displayed/canceled) within the notification screen W6 (see FIG. 22), for example. In the example illustrated in FIG. 22, the numeral "5" corresponds the preceding given period login history reference count 542. It is advantageous to display the bonus (see reference sign 32) that was given in the step S44 within the reference count notification display 30.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method that causes a computer to manage a login history of each of players, and provide a game service, the method comprising:

causing the computer to register a plurality of the players according to an operation input performed by each of the players so that the players are linked to each other as a plurality of linked players;

causing the computer to perform a bonus-giving process on a processing target player, the processing target player being one of the players which are linked to each other, tie bonus-giving process is performed on the processing target player each time the processing target player logs in during a given period, the bonus-giving process determines whether or not the login history of a linked player of the plurality of linked player satisfies the bonus-giving condition based on the login history of the linked player within the given period, the bonus-giving process giving a given bonus to the processing target player when the login history of the linked player is determined to satisfy a given bonus-giving condition, the linked player being another one of the players which are linked to each other and being linked to the processing target player, the bonus-giving process determines which of a plurality of different bonuses to give as the given bonus based on a count of the login history, the plurality of different bonuses having different values corresponding to different counts of the login history, wherein the different bonuses having a higher value correspond to a higher count of the login history;

causing the computer to count a reference count of the linked player, the reference count being a number of times in which the login history of the linked player has been referred to by the bonus-giving process for each of the players, except for the linked player, which are linked to each other in determining, for the processing target player, whether the login history of the linked player satisfies the given bonus-giving condition; and causing the computer to notify the linked player of the reference count, wherein the performing of the bonus-giving process is based on the login histories, within the given period, of the plurality of linked players not including the processing target player, the count of the login history increases for each of the linked players that logs in, the count of the login history is cumulative during the given period, the count of the login history is reset after the current given period, a value of the given bonus for the bonus-giving process on the processing target player continues to increase during the given period as the count of the login histories of the linked players increase, even after the bonus-giving process gives the given bonus to the processing target player in the given period.

2. The method as defined in claim 1, the performing of the bonus-giving process including determining whether or not the login history of the linked player satisfies the bonus-giving condition based on the login history of the linked player within the given period until the processing target player has logged in; and the method further comprising causing the computer to perform a control process so that the given bonus is valid only during game play performed by the processing target player based on a current login of the processing target player.

3. The method as defined in claim 1, further comprising:
causing the computer to change the bonus given to the processing target player based on a number of the linked players who have logged in within the given period.

4. The method as defined in claim 1, further comprising:
causing the computer to change the bonus given to the processing target player based on the count of the login history of the linked player within the given period.

5. The method as defined in claim 1, further comprising:
causing the computer to change the bonus given to the processing target player based on a number of the linked players whose login date/time satisfies a given date/time condition.

6. The method as defined in claim 1,
the login history including login position information that indicates a place where each player has logged in, and
the method further comprising causing the computer to change the bonus given to the processing target player based on a number of the linked players whose login position information satisfies a given position condition.

7. The method as defined in claim 1, further comprising:
causing the computer to present the bonus-giving condition to the processing target player when the processing target player has logged in.

8. The method as defined in claim 1, further comprising:
causing the computer to select an item provided to the one player by a lottery from a plurality of items including a rare item,
the given bonus being increasing of a win probability of the rare item during the lottery.

9. A server system that manages a login history of each of players, the server system comprising:
a registration section that registers the players according to an operation input performed by each of the players so that the players are linked to each other as a plurality of linked players;
a bonus-giving section that performs a bonus-giving process on a processing target player, the processing target player being one of the players which are linked to each other, the bonus-giving process is performed on the processing target player each time the processing target player logs in during a given period, the bonus-giving process determines whether or not the login history of a linked player of the plurality of linked players satisfies the bonus-giving condition based on the login history of the linked player within the given period, the bonus-giving process giving a given bonus to the processing target player when the login history of the linked player is determined to satisfy a given bonus-giving condition, the linked player being another one of the players which are linked to each other and being linked to the processing target player, the bonus-giving process determines which of a plurality of different bonuses to give as the given bonus based on a count of the login history, the plurality of different bonuses having different values corresponding to different counts of the login history, wherein the different bonuses having a higher value correspond to a higher count of the login history;
a count section that counts a reference count of the linked player, the reference count being a number of times in which the login history of the linked player has been referred to by the bonus-giving process for each of the players, except for the linked player, which are linked to each other in determining, for the processing target player, whether the login history of the linked player satisfies the given bonus-giving condition; and
a notification section that notifies the linked player of the reference count, wherein
the performing of the bonus-giving process is based on the login histories, within the given period, of the plurality of linked players not including the processing target player,
the count of the login history increases for each of the linked players that logs in, the count of the login history is cumulative during the given period, the count of the login history is reset after the current given period,
a value of the given bonus for the bonus-giving process on the processing target player continues to increase during the given period as the count of the login histories of the linked players increase, even after the bonus-giving process gives the given bonus to the processing target player in the given period.

10. A method that causes a computer to manage a login history of each of players, and provide a game service, the method comprising:
causing the computer to register the players according to an operation input performed by each of the players so that the players are linked to each other as a plurality of linked players;
causing the computer to perform a bonus-giving process on a processing target player, the processing target player being one of the players which are linked to each other, the bonus-giving process is performed on the processing target player each time the processing target player logs in during a given period, the bonus-giving process determines whether or not the login history of a linked player of the plurality of linked players satisfies the bonus-giving condition based on the login history of the linked player within the given period, the bonus-giving process giving a given bonus to the processing target player when the login history of the linked player is determined to satisfy a given bonus-giving condition, the linked player being another one of the players which are linked to each other and being linked to the processing target player, the bonus-giving process determines which of a plurality of different bonuses to give as the given bonus based on a count of the login history, the plurality of different bonuses having different values corresponding to different counts of the login history, wherein the different bonuses having a higher value correspond to a higher count of the login history;
causing the computer to count a reference count of the linked player, the reference count being a number of times in which the login history of the linked player has been referred to by the bonus-giving process for each of the players, except for the linked player, which are linked to each other in determining, for the processing target player, whether the login history of the linked player satisfies the given bonus-giving condition; and causing the computer to give a reference bonus that corresponds to the reference count to the linked player, wherein the performing of the bonus-giving process is based on the login histories, within the given period, of the plurality of linked players not including the processing target player, the count of the login history increases for each of the linked players that logs in, the count of the login history is cumulative during the given period, the count of the login history is reset after the current given period, a value of the given bonus for the bonus-giving process on the processing target player continues to increase during the given period as the count of the login histories of the linked players increase, even after the bonus-giving process gives the given bonus to the processing target player in the given period.

11. A server system that manages a login history of each of players, the server system comprising:

a registration section that registers the players according to an operation input performed by each of the players so that the players are linked to each other as a plurality of linked players;

a bonus-giving section that performs a bonus-giving process on a processing target player, the processing target player being one of the players which are linked to each other, the bonus-giving process is performed on the processing target player each time the processing target player logs in during a given period, the bonus-giving process determines whether or not the login history of a linked player of the plurality of linked players satisfies the bonus-giving condition based on the login history of the linked player within the given period, the bonus-giving process giving a given bonus to the processing target player when the login history of a linked player is determined to satisfy a given bonus-giving condition, the linked player being another one of the players which are linked to each other and being linked to the processing target player, the bonus-giving process determines which of a plurality of different bonuses to give as the given bonus based on a count of the login history, the plurality of different bonuses having different values corresponding to different counts of the login history, wherein the different bonuses having a higher value correspond to a higher count of the login history;

a count section that counts a reference count of the linked player, the reference count being a number of times in which the login history of the linked player has been referred to by the bonus-giving process for each of the players, except for the linked player, which are linked to each other in determining, for the processing target player, whether the login history of the linked player satisfies the given bonus-giving condition; and a reference bonus-giving section that gives a reference bonus that corresponds to the reference count to the linked player, wherein the performing of the bonus-giving process is based on the login histories, within the given period, of the plurality of linked players not including the processing target player, the count of the login history increases for each of the linked players that logs in, the count of the login history is cumulative during the given period, the count of the login history is reset after the current given period, a value of the given bonus for the bonus-giving process on the processing target player continues to increase during the given period as the count of the login histories of the linked players increase, even after the bonus-giving process gives the given bonus to the processing target player in the given period.

* * * * *